US012658430B2

(12) United States Patent
Kim et al.

(10) Patent No.: US 12,658,430 B2
(45) Date of Patent: Jun. 16, 2026

(54) ALL-SOLID SECONDARY BATTERY AND METHOD OF MANUFACTURING THE SAME

(71) Applicant: Samsung Electronics Co., Ltd., Suwon-si (KR)

(72) Inventors: Jusik Kim, Hwaseong-si (KR); Myungjin Lee, Seoul (KR); Wonseok Chang, Seoul (KR); Sung Heo, Suwon-si (KR); Ryounghee Kim, Uiwang-si (KR); Sewon Kim, Suwon-si (KR); Gabin Yoon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 875 days.

(21) Appl. No.: 17/847,328

(22) Filed: Jun. 23, 2022

(65) Prior Publication Data

US 2022/0416235 A1 Dec. 29, 2022

(30) Foreign Application Priority Data

Jun. 25, 2021 (KR) ........................ 10-2021-0082911
May 30, 2022 (KR) ........................ 10-2022-0066357

(51) Int. Cl.
    *H01M 4/48* (2010.01)
    *H01M 4/36* (2006.01)
    (Continued)

(52) U.S. Cl.
    CPC .......... *H01M 4/483* (2013.01); *H01M 4/366* (2013.01); *H01M 4/405* (2013.01); *H01M 4/587* (2013.01);
    (Continued)

(58) Field of Classification Search
    None
    See application file for complete search history.

(56) References Cited

U.S. PATENT DOCUMENTS 6,402,795 B1 * 6/2002 Chu ..................... H01M 10/052
                                                         429/231.95
6,485,622 B1 11/2002 Fu
                    (Continued)

FOREIGN PATENT DOCUMENTS

KR 1020180001973 A 1/2018
KR 101905992 B1 10/2018
                    (Continued)

OTHER PUBLICATIONS

Kim WS, Vo TN, Kim IT. GeTe—TiC—C Composite Anodes for Li-Ion Storage. Materials (Basel). Sep. 23, 2020;13(19):4222. doi: 10.3390/ma13194222. PMID: 32977464; PMCID: PMC7579072. (Year: 2020).*

(Continued)

*Primary Examiner* — Jeffrey T Barton
*Assistant Examiner* — Anna E. Gould
(74) *Attorney, Agent, or Firm* — CANTOR COLBURN LLP

(57) ABSTRACT

An all-solid secondary battery includes: a cathode layer including a cathode active material; an anode layer including an anode current collector, a first anode active material layer, and a second anode active material layer between the anode current collector and the first anode active material layer; and a solid electrolyte layer between the cathode layer and the anode layer and including a solid electrolyte, wherein the first anode active material layer is adjacent to the solid electrolyte layer, has pores, and contains a metal or metal alloy capable of forming an alloy or a compound with lithium, and the second anode active material layer includes a second anode active material including a carbon anode active material and optionally a metal or metalloid anode active material.

33 Claims, 22 Drawing Sheets

(51) Int. Cl.

| | |
|---|---|
| *H01M 4/40* | (2006.01) |
| *H01M 4/587* | (2010.01) |
| *H01M 10/0525* | (2010.01) |
| *H01M 10/0562* | (2010.01) |
| *H01M 10/058* | (2010.01) |
| *H01M 4/02* | (2006.01) |

(52) U.S. Cl.
CPC ... *H01M 10/0525* (2013.01); *H01M 10/0562* (2013.01); *H01M 10/058* (2013.01); *H01M 2004/021* (2013.01); *H01M 2300/0077* (2013.01)

(56) References Cited

U.S. PATENT DOCUMENTS

| | | | |
|---|---|---|---|
| 7,273,682 | B2 | 9/2007 | Park et al. |
| 7,901,658 | B2 | 3/2011 | Weppner |
| 7,914,932 | B2 | 3/2011 | Yoshida et al. |
| 8,828,580 | B2 | 9/2014 | Visco et al. |
| 8,865,355 | B2 | 10/2014 | Iriyama et al. |
| 9,034,524 | B2 | 5/2015 | Moon et al. |
| 9,531,036 | B2 | 12/2016 | Ohta et al. |
| 9,559,396 | B2 | 1/2017 | Lee et al. |
| 9,761,905 | B2 | 9/2017 | Eisele et al. |
| 9,859,559 | B2 | 1/2018 | Kim et al. |
| 10,033,066 | B2 | 7/2018 | Nemori et al. |
| 10,109,851 | B2 | 10/2018 | Song et al. |
| 10,128,533 | B2 | 11/2018 | Yamamoto et al. |
| 10,135,084 | B2 | 11/2018 | Lee et al. |
| 10,985,407 | B2 | 4/2021 | Suzuki et al. |
| 2016/0164138 | A1 | 6/2016 | Han et al. |
| 2017/0025705 | A1 | 1/2017 | Miara et al. |
| 2018/0006326 | A1 | 1/2018 | O'Neill et al. |
| 2018/0123167 | A1 | 5/2018 | Yi et al. |
| 2018/0205112 | A1 | 7/2018 | Thomas-Alyea et al. |
| 2018/0226633 | A1 | 8/2018 | Fujiki et al. |
| 2018/0301754 | A1 | 10/2018 | Badding et al. |
| 2019/0044186 | A1 | 2/2019 | Kim et al. |
| 2019/0088993 | A1 | 3/2019 | Ohta |
| 2019/0157723 | A1* | 5/2019 | Suzuki .................. H01M 10/44 |
| 2019/0207252 | A1 | 7/2019 | Badding et al. |
| 2019/0393487 | A1* | 12/2019 | He ................... H01M 10/4235 |
| 2019/0393505 | A1 | 12/2019 | Suzuki et al. |
| 2020/0006806 | A1 | 1/2020 | Allenic et al. |
| 2020/0243841 | A1* | 7/2020 | Yang .................... H01M 4/622 |
| 2020/0270143 | A1 | 8/2020 | Ohta et al. |
| 2020/0313164 | A1 | 10/2020 | Suzuki et al. |
| 2020/0328465 | A1 | 10/2020 | Sakaida et al. |
| 2020/0403267 | A1 | 12/2020 | Li et al. |
| 2021/0043966 | A1 | 2/2021 | Gwon et al. |
| 2021/0104778 | A1* | 4/2021 | Ono .................. H01M 10/0585 |
| 2021/0119203 | A1 | 4/2021 | Kim et al. |
| 2021/0202936 | A1* | 7/2021 | Oh ........................ H01M 4/366 |
| 2021/0242495 | A1 | 8/2021 | Kim et al. |
| 2021/0257606 | A1 | 8/2021 | Kim et al. |
| 2021/0376378 | A1 | 12/2021 | Jung et al. |
| 2023/0246177 | A1 | 8/2023 | Lee et al. |
| 2024/0006595 | A1 | 1/2024 | Kim et al. |

FOREIGN PATENT DOCUMENTS

| | | | |
|---|---|---|---|
| KR | 102012414 | B1 | 8/2019 |
| KR | 102069284 | B1 | 1/2020 |
| KR | 1020200028165 | A | 3/2020 |
| KR | 102160708 | B1 | 9/2020 |
| KR | 1020210149619 | A | 12/2021 |
| KR | 1020220065653 | A | 5/2022 |
| WO | 2015146315 | A1 | 10/2015 |
| WO | 2019135319 | A1 | 7/2019 |
| WO | 2020070956 | A1 | 4/2020 |
| WO | 2020072524 | A1 | 4/2020 |
| WO | 2020176905 | A1 | 9/2020 |

OTHER PUBLICATIONS

Liu et al. Recent progress on germanium-based anodes for lithium ion batteries: Efficient lithiation strategies and mechanisms. Sep. 2020 https://doi.org/10.1016/j.ensm.2020.05.010 (Year: 2020).*

Malarkey EB, Parpura V. Carbon nanotubes in neuroscience. Acta Neurochir Suppl. 2010;106:337-41. doi: 10.1007/978-3-211-98811-4_62. PMID: 19812974; PMCID: PMC2908329. (Year: 2010).*

Li et al. Recent advances in the interfacial stability, design and in situ characterization of garnet-type $Li7La3Zr2O12$ solid-state electrolytes based lithium metal batteries (Year: 2021).*

Improving the cycling stability of three-dimensional nanoporous Ge anode by embedding Ag nanoparticles for high-performance lithium-ion battery (Year: 2021).*

Cheol-Min Park et al., "Electrochemical Behaviors and Reaction Mechanism of Nanosilver with Lithium," Electrochemical and Solid-State Letters, Jun. 12, 2009, pp. A171-A175, vol. 12, No. 9.

Extended European Search Report issued Nov. 22, 2022 of EP Patent Application No. 22180774.6.

Fan Huilin et al: "Recent advances of metal telluride anodes for high-performance lithium/sodium-ion batteries", Mater. Horiz., vol. 9, No. 2, (Nov. 19, 2021), pp. 524-546, XP055981649.

Ma Fei et al: "Hierarchical core-shell hollow CoMoS4@Ni—Co—S nanotubes hybrid arrays as advanced electrode material for supercapacitors", Electrochimica Acta, Elsevier, Amsterdam, NL, vol. 331, (Dec. 6, 2019), XP086023594.

* cited by examiner

FIG. 9C
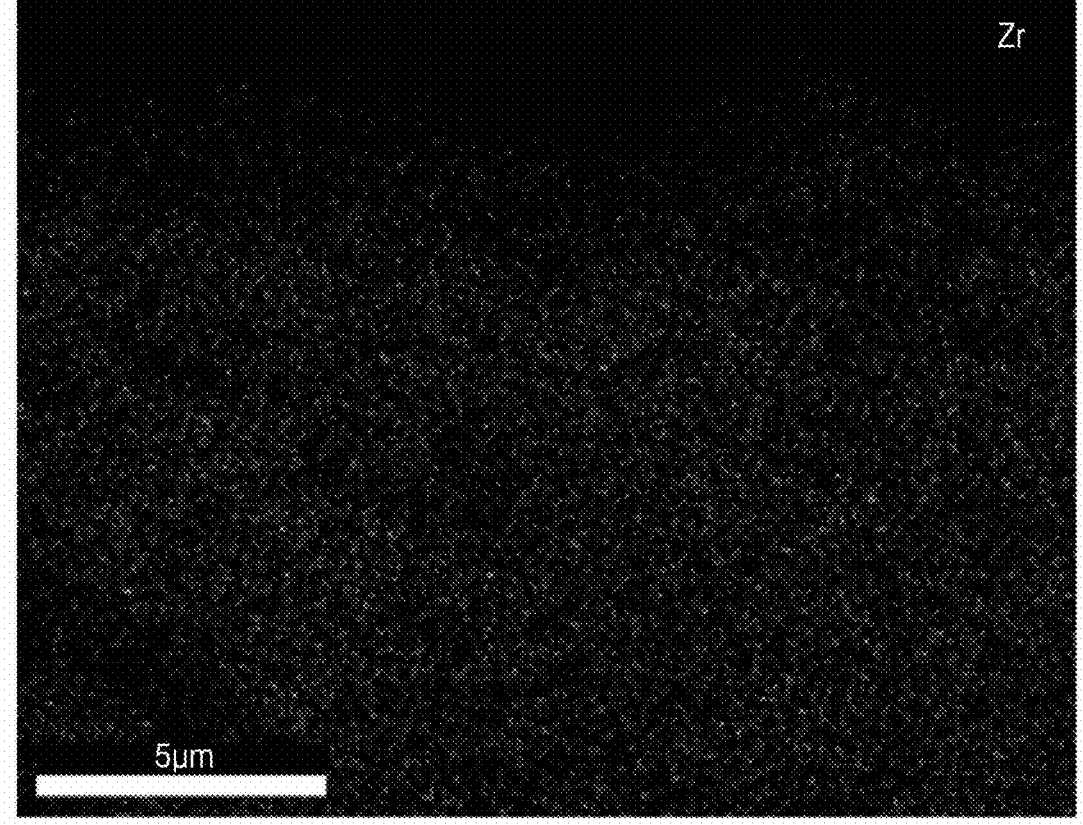

FIG. 10A
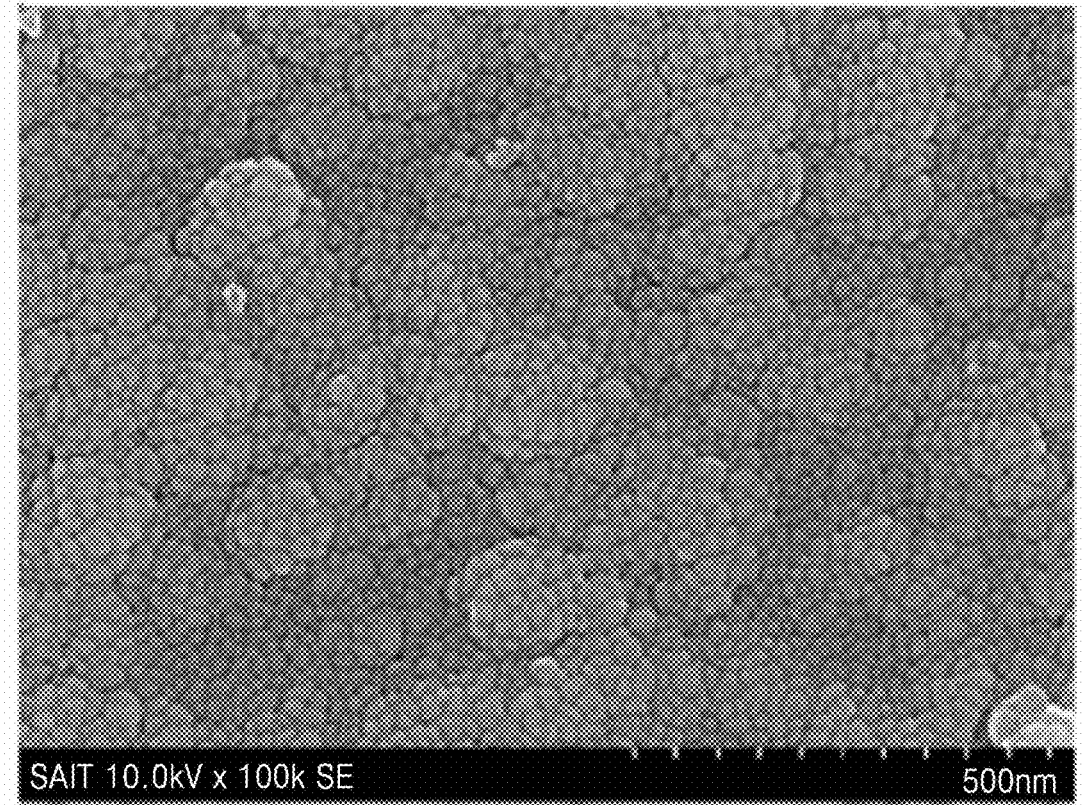

SAIT 10.0kV x 300k SE                                        100nm

FIG. 10C
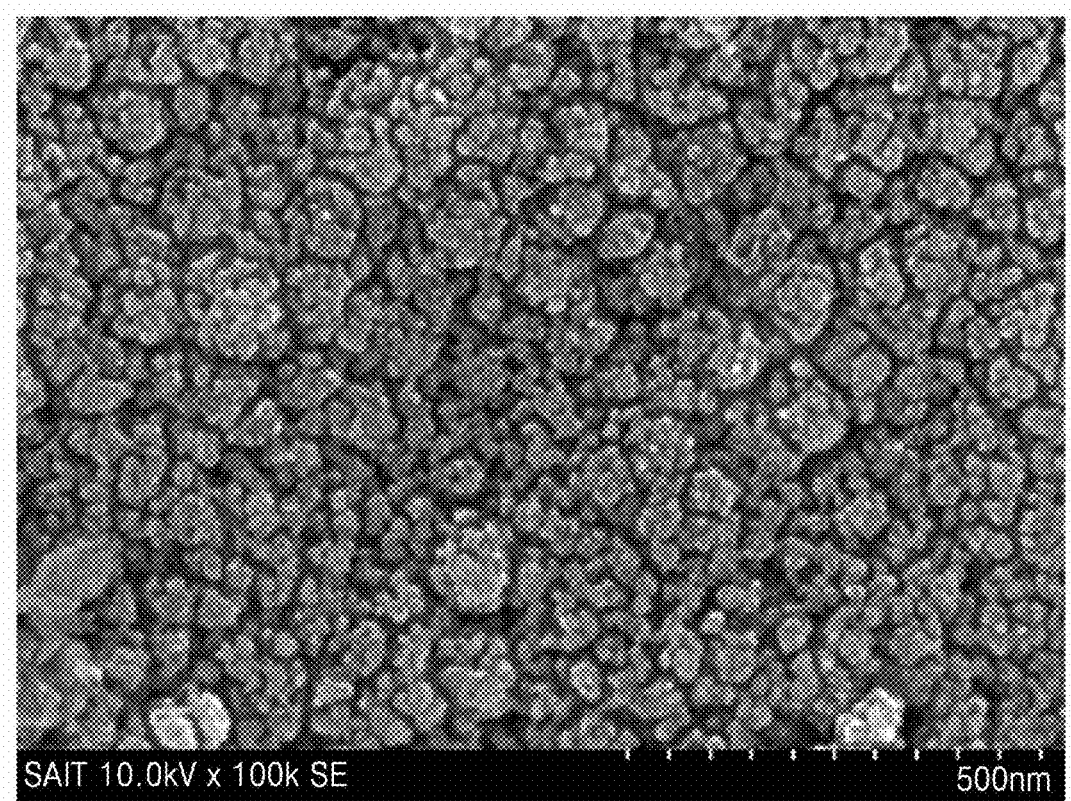

SAIT 10.0kV x 300k SE                                    100nm

1

ALL-SOLID SECONDARY BATTERY AND METHOD OF MANUFACTURING THE SAME

CROSS-REFERENCE TO RELATED APPLICATION

This application claims priority to Korean Patent Application Nos. 10-2021-0082911, filed on Jun. 25, 2021, and 10-2022-0066357, filed on May 30, 2022, in the Korean Intellectual Property Office, and the benefits accruing therefrom under 35 U.S.C. § 119, the content of which is incorporated by reference herein in its entirety.

BACKGROUND

1. Field

The present disclosure relates to all-solid secondary batteries and methods of manufacturing the same.

2. Description of the Related Art

Recently, in response to industrial demands, batteries having high energy density and safety have been actively developed. For example, lithium-ion batteries are being used not only in the fields of information-related appliances and communication appliances, but also in the fields of automobiles. In the fields of automobiles, safety is especially important because it has an influence on life.

Since commercially available lithium-ion batteries use an electrolyte including a flammable organic solvent, there is a possibility of overheating and fire when a short circuit occurs. In this regard, all-solid batteries using a solid electrolyte instead of such a liquid electrolyte have been proposed.

Since all-solid batteries do not use flammable organic solvents, the possibility of fire or explosion may be greatly reduced even when a short circuit occurs. Accordingly, the safety of such all-solid secondary batteries may be greatly increased as compared with that of lithium-ion batteries. Nonetheless, there remains a need for an improved all-solid secondary battery.

SUMMARY

Provided are all-solid secondary batteries in which a short circuit can be prevented during charging and discharging and with improved cycle characteristics.

Also provided are methods of manufacturing the all-solid secondary batteries.

Additional aspects will be set forth in part in the description which follows and, in part, will be apparent from the description, or may be learned by practice of the presented embodiments of the disclosure.

According to an aspect of an embodiment, an all-solid secondary battery includes: a cathode layer including a cathode active material; an anode layer including an anode current collector, a first anode active material layer, and a second anode active material layer between the anode current collector and the first anode active material layer; and a solid electrolyte layer disposed between the cathode layer and the anode layer and including a solid electrolyte, wherein the first anode active material layer is disposed adjacent to the solid electrolyte layer, has pores, and contains a metal or metal alloy capable of forming an alloy or a compound with lithium, and the second anode active material layer comprises a second anode active material

2 including a carbon anode active material and optionally a metal or metalloid anode active material.

According to an aspect of another embodiment, a method of manufacturing an all-solid secondary battery includes: providing a solid electrolyte layer having a first surface and an opposite second surface; placing a first anode active material layer on the first surface of the solid electrolyte layer; forming pores in the first anode active material layer to prepare a porous first anode active material layer; providing an anode current collector and a second anode active material layer on the anode current collector; placing the anode current collector on the porous first anode active material layer; and placing a cathode active material layer on the second surface of the solid electrolyte layer to manufacture an all-solid secondary battery.

The forming pores in the first anode active material layer may include treating the first anode active material layer with an acid or a pore former to form pores in the first anode active material layer.

The first anode active material layer may include a Ge—Te alloy, and a molar ratio of Ge and Te in the Ge—Te alloy before treating the first anode active material layer with the acid may be about 2.5:1 to about 1:500, and a molar ratio of Ge and Te in the Ge—Te alloy after treating the first anode active material layer with the acid may be about 1:1.5 to about 1:100.

The placing the first anode active material layer on the first surface of the solid electrolyte layer may include at least one of sputtering, spin coating, drop coating, spray coating, or solution infiltration. The method may further include heat treating at about 150° C. to about 400° C. after the placing of the first anode active material layer on the first surface of the solid electrolyte layer.

According to an aspect of another embodiment, an anode layer includes an anode current collector, a porous first anode active material layer, and a second anode active material layer between the anode current collector and the first anode active material layer; wherein the first anode active material layer is adjacent to a solid electrolyte layer and includes a metal or metal alloy capable of forming an alloy or a compound with lithium, and the second anode active material layer includes a second anode active material including a carbon anode active material and optionally a metal or metalloid anode active material.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 9A to 9E show the results of scanning electron microscope-energy-dispersive X-ray spectroscopy (SEM-EDS) analysis of a first anode active material layer in the all-solid secondary battery of Example 1;

FIGS. 10A and 10B show the results of scanning electron microscope (SEM) analysis of a first anode active material layer (GeTe) before acid treatment in Example 1;

FIGS. 10C and 10D show the results of SEM analysis of the first anode active material layer (GeTe) after acid treatment in Example 1.

DETAILED DESCRIPTION

Figure 1A:
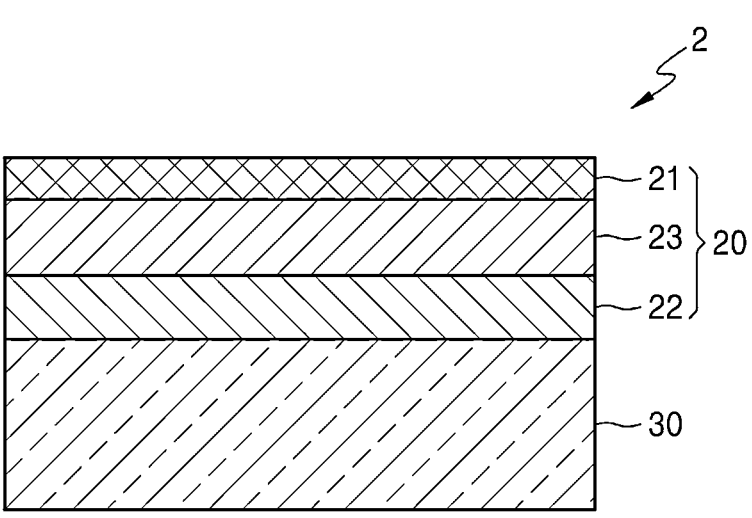
FIG. 1A shows a cross-section of an embodiment of an anode structure for an all-solid secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In all-solid secondary batteries, since an electrolyte is solid, lithium can be locally deposited at the interface between a solid electrolyte layer and an anode layer. If this lithium grows and penetrates the solid electrolyte layer, the battery may develop a short circuit. Further, since the solid electrolyte layer and the anode layer are simply stacked, the effective interface area between the solid electrolyte layer and the anode layer can become smaller than the actual contact area. Accordingly, as the interfacial resistance increases at the interface between the solid electrolyte layer and the anode layer, the internal resistance of the battery may increase, and as a result, the cycle characteristics of the battery may be deteriorated.

To address the above anode challenges, hereinafter, an anode structure for an all-solid secondary battery according to an embodiment, an all-solid secondary battery including the same, and a method of manufacturing the all-solid secondary battery will be described in further detail.

There is provided an all-solid secondary battery including: a cathode layer including a cathode active material; an anode layer including an anode current collector, a first anode active material layer, and a second anode active material layer between the anode current collector and the first anode active material layer; and a solid electrolyte layer between the cathode layer and the anode layer and including a solid electrolyte. The first anode active material layer is adjacent to the solid electrolyte layer, has pores, and contains a metal or metal alloy capable of forming an alloy or a compound with lithium, and the second anode active material layer a second anode active material including a carbon anode active material and optionally a metal or metalloid anode active material.

Since an all-solid secondary battery using an anode layer made of a lithium alloy has a lower lithium-ion diffusion coefficient than a lithium-ion diffusion coefficient in an all-solid secondary battery using an anode layer made of a carbon-based anode active material, lithium ions may move more slowly than desired, thereby deteriorating kinetic performance of the all-solid secondary battery.

The carbon anode active material is in a form of particles, and the carbon anode active material particles have an average particle diameter of about 4 micrometers or less, for example, about 10 nanometers to about 4 micrometers.

Further, the anode layer of the all-solid secondary battery, including the carbon-based anode active material, may not have excellent bonding force or suitable adhesion with the solid electrolyte, so that the interfacial stability between the anode layer and the solid electrolyte layer may not be sufficient. Further, when the anode layer is made of only a metal, electrical current non-uniformity may occur due to aggregation of particles during alloying with lithium and dealloying during charging and discharging. Also, an alloy phase with a low lithium diffusion coefficient, e.g., a lithium diffusion coefficient less than lithium metal, may be formed, thereby deteriorating the high-rate characteristics of the all-solid secondary battery. Further, during high-temperature charging and discharging, a metal may diffuse in electrodes, thereby deteriorating the lifespan characteristics of the all-solid secondary battery.

The all-solid secondary battery according to an embodiment is provided to solve the above-described problems.

Here, an effect of increasing a surface diffusion path may be obtained by selecting the first anode active material layer contacting the solid electrolyte layer to have a pore structure having a large surface area to increase a lithium diffusion rate. Thus, lithium ions may move more rapidly from the first anode active material layer to the second anode active material layer by selecting materials having a suitable the lithium-ion diffusion coefficient. In addition, the adhesion force between the second anode active material layer disposed to be in contact with the anode current collector and the solid electrolyte layer may be improved.

The pores of the first anode active material layer may be formed in all or a portion of the first anode active material layer. The pores may be formed using acid treatment or a pore former, for example. Here, the pore size of the first anode active material layer may be about 3 nanometers (nm) to about 50 nm, about 3.5 nm to about 45 nm, about 4 nm to about 40 nm, or about 5 nm to about 30 nm. The pore size may be determined through a scanning electron microscope (SEM), a transmission electron microscope (TEM), or the like. As used herein, the pore size refers to an average diameter when the pores are spherical, and a major axis length when the pores are non-spherical.

The first anode active material has a porosity of about 1% to about 90%, for example, about 20% to about 80%, based on total volume of the first anode active material layer.

The second anode active material of the second anode active material layer may be present in the pores of the first anode active material layer. Even when the second anode active material is present in the pores of the first anode active material layer, some of the pores of the first anode active material layer may remain. Here, the second anode active material includes i) a carbon-based anode active material or ii) a carbon-based anode active material and a metal or metalloid anode active material.

In the all-solid secondary battery, after pressing during a battery manufacturing process, the second anode active material of the second anode active material layer may be provided to the pores of the first anode active material layer to decrease a porosity of the first anode active material layer or to fill or remove the pores. As a result, the first anode active material layer may have a non-porous structure. Here, the second anode active material is, for example, i) a carbon-based anode active material or ii) a mixture or composite of a carbon-based anode active material and a metal or metalloid anode active material.

The pressing refers to pressing to form an anode layer/solid electrolyte layer structure or an anode layer/solid electrolyte layer/cathode layer structure.

The first anode active material layer includes a metal or metal alloy capable of reacting with lithium to form an alloy or a compound.

The metal alloy contains at least one metal and may contain, for example, a non-metal.

The metal alloy is represented by M1M2, wherein M1 is a first element, for example, a first metal, which is soluble in an acid, and M2 is a second element, for example, a second metal, which is insoluble in the acid. According to an embodiment, when the M1M2 alloy is contacted with or immersed in an electrolyte having a pH of 7 or less, e.g., a pH of about 1 to about 6.5, or about 2 to about 6, or about 4 to about 5, selective dissolution occurs to prepare a first anode active material layer having a nanoporous structure.

The lithium-ion reduction potential of M1 is different from the lithium-ion reduction potential of M2. The lithium-ion reduction potential of M1 may be larger or smaller than the lithium-ion reduction potential of M2. A difference of lithium-ion reduction potential between M1 and M2 is, for example, about 0.05 V or more, about 0.1 V or more, about 0.2 V or more, about 0.3 V or more, about 0.4 V or more, or about 0.5 V or more. The difference of lithium-ion reduction potential between M1 and M2 can be less than 2 V, e.g., about 0.05 V to about 2 V, or about 0.1 V to about 1.5 V. Further, when forming an alloy with Li, M1 and M2 may each have a eutectic temperature of about 300° C. to about 1500° C., for example, 600° C. or higher, e.g., about 600° C. to about 1200° C., or 650° C. to about 1000° C., and thus fluidity is low.

M1 can be at least one of Li, Na, K, Rb, Cs, Mg, Ca, Sr, Ba, Sc, V, Cr, Mn, Fe, Co, Ni, Cu, Zn, Ga, Al, Ge, Y, Zr, Hf, Nb, Tc, Rh, Cd, In, B, Si, P, F, Cl, Br, I, S, As, Sb, Bi, Ta, Re, Hg, Tl, or Pb, optionally in combination with at least one selected from carbon (C), or nitrogen (N). M2 includes at least one of Ti, Mo, Ru, Pd, Ag, Sn, Se, Te, W, Os, Ir, Pt, or Au.

M1 can be germanium (Ge), and M2 can be at least one of tellurium (Te), or selenium (Se).

In the M1M2 alloy, a mixing molar ratio of M1 and M2 is stoichiometrically selected in a range capable of forming an alloy. According to an embodiment, the mixing molar ratio of M1 and M2 can be in a range of about 1:1 to about 1:500, about 1:1 to about 1:300, or about 1:1.5 to about 1:100. In this mixing molar ratio, for example, pores may be formed through acid treatment of the first anode active material layer.

According to another embodiment, the mixing molar ratio of M1 and M2 can be in a range of about 2.5:1 to about 1:500, about 1:1 to about 1:500, about 1:1 to about 1:300, or about 1:1.5 to about 1:100. In this mixing molar ratio, for example, pores may be formed through treatment of the first anode active material layer using a pore former. The mixing molar ratio of M1 and M2 may be determined from EDS analysis or XPS analysis. When the mixing molar ratio of M1 and M2 is within the above ranges, high lithium diffusion may be maintained, and the interfacial resistance between the anode layer and the solid electrolyte layer may be reduced, thereby an all-solid secondary battery having improved high-rate characteristics and lifespan characteristics can be manufactured.

The first anode active material layer can be manufactured by forming an alloy layer that maintains high lithium diffusion during alloying/dealloying with lithium and has low particle fluidity and agglomeration at the interface adjacent to the solid electrolyte layer.

The metal alloy maintains its original state during charging and discharging because it has low fluidity. For example, when the first anode active material layer is made of a metal having high fluidity, the metal moves toward Li during charging, but the Ge—Te alloy maintains its original layer shape even during charging and discharging. Such fluidity tendency can increase when the eutectic temperature is low during alloying with lithium (Li). In the case of a Li—Ge alloy and a Li—Te alloy, the eutectic temperature during alloying with lithium (Li) is, for example, 600° C. or higher.

In the all-solid secondary battery having the first anode active material layer containing the above-described metal alloy, high-rate characteristics may be improved by reducing the interfacial resistance of a battery. Further, when lithium is mainly deposited at the interface between the second anode active material layer and the anode current collector, lifespan characteristics may be improved by continuously reducing current concentration under long-term operation at high current density.

The first anode active material layer can be formed as a metal alloy layer having rapid Li diffusion and capable of reversible re-alloying after alloying/dealloying with lithium.

The lithium-ion diffusion coefficient in the first anode active material layer can be selected to be about $1\times10^{-14}$ square centimeters per second (cm²/sec) or more at 25° C., so that lithium introduced into the first anode active material layer may be rapidly moved to the second anode active material layer. Further, when acid treatment of the first anode active material layer is performed before bonding with the second anode active material, the bonding force of the first anode active material layer with the second anode active material may be further increased. As a result, an all-solid secondary battery having improved long-term lifespan may be manufactured by maintaining the bonding force between the solid electrolyte layer and the anode layer during charging and discharging.

FIG. 1A shows a stacked structure of an anode structure having a multilayer structure according to an embodiment.

An anode structure 2 includes an anode layer 20 and a solid electrolyte layer 30. The anode layer 20 has a structure in which a first anode active material layer 22 is disposed on an anode current collector 21 and a second anode active material layer 23 is disposed between the anode current collector 21 and the first anode active material layer 22. The first anode active material layer 22 may be provided with pores, and includes a metal or alloy capable of forming a compound or an alloy with lithium.

The lithium-ion diffusion coefficient in the first anode active material layer 22 is about $1\times10^{-14}$ square centimeter per second (cm²/sec) or more at 25° C., and is selected to be equal to or greater than the lithium-ion diffusion coefficient in the second anode active material layer 23.

While not wanting to be bound by theory, it is understood that because the first anode active material layer 22 includes a porous structure having a large surface area to have a high lithium-ion diffusion coefficient, lithium introduced into the first anode active material layer 22 quickly moves to the second anode active material layer 23, and thus it is possible to prevent the local deposition of lithium inside the first anode active material layer 22 or at the interface between the first anode active material layer 22 and the solid electrolyte layer 30. The lithium-ion diffusion coefficient of the first anode active material layer 22 at 25° C. may be, for example, about $1\times10^{-14}$ cm²/sec or more, about $1\times10^{-13}$ cm²/sec or more, about $1\times10^{-12}$ cm²/sec or more, about $1\times10^{-11}$ cm²/sec or more, about $1\times10^{-10}$ cm²/sec or more, or about $5\times10^{-10}$ cm²/sec or more. The lithium-ion diffusion coefficient of the second anode active material layer 23 at 25° C. may be, for example, about $1\times10^{-15}$ cm²/sec or more, about $1\times10^{-14}$ cm²/sec or more, about $1\times10^{-13}$ cm²/sec or more, about $1\times10^{-12}$ cm²/sec or more, about $1\times10^{-11}$ cm²/sec or more, or about $5\times10^{-11}$ cm²/sec or more, e.g., about $1\times10^{-14}$ cm²/sec to about $1\times10^{-3}$ cm²/sec, or about $1\times10^{-12}$ cm²/sec to about $1\times10^{-10}$ cm²/sec.

The first anode active material layer 22 includes a metal or a metal alloy that forms an alloy or a compound with lithium. The metal alloy can have high lithium diffusion and low particle fluidity, so stable interfacial contact may be maintained during high-rate charging and discharging, and a fast lithium diffusion phase may be maintained even after lithium alloying and de-alloying processes.

The metal alloy can be at least one of a $Ge_xTe_y$ alloy ($0<x\leq3$, $0<y\leq2$), $Sb_xTe_y$ alloy ($0<x<1$, $0<y<1$), $Ge_xSe_y$ alloy ($0<x\leq1$, $0<y\leq1$), $Te_xGa_y$ alloy ($0<x\leq3$, $0<y\leq2$), $Te_xZn_y$ ($0<x\leq1$, $0<y\leq2$), $Te_xBi_y$ ($0<x\leq3$, $0<y\leq2$), $Te_xSb_y$ ($0<x\leq3$, $0<y\leq2$), $Te_xBi_y$ ($0<x\leq6$, $0<y\leq14$), $Te_xAu_y$ ($0<x\leq2$, $0<y\leq1$), $Te_xAs_y$, (0<x≤3, 0<y≤4), $Te_xAs_y$, (0<x≤3, 0<y≤2), $Te_xSn_y$, (0<x≤1, 0<y≤1), $Te_xSr_y$, (0<x≤1, 0<y≤1), $Te_xY_y$, (0<x≤3, 0<y≤2), $Te_xZr_y$, (0<x≤5, 0<y≤1), $Te_xNb_y$, (0<x≤2, 0<y≤1), $Te_xMo_y$, (0<x≤2, 0<y≤1), $Te_xAg_y$, (0<x≤1, 0<y≤2), $Te_xIn_y$, (0<x≤3, 0<y≤2), $Te_xPd_y$, (0<x≤2, 0<y≤1), $Bi_x$—$Sb_y$—$Te_z$ (0<x≤4, 0<y≤4, 0<z≤4), $Bi_x$—$Se_y$—$Tey_z$ (0<x≤4, 0<y≤4, 0<z≤4), $Se_x$—$Sb_y$—$Te_z$ (0<x≤4, 0<y≤4, 0<z≤4), $Ge_x$—$Sb_y$—$Te_z$ (0<x≤4, 0<y≤4, 0<z≤4), or $Ge_x$—$Sb_y$—$Se_z$—$Te_k$ (0<x≤4, 0<y≤4, 0<k≤4).

The metal alloy may be, for example, at least one of a $Ge_xTe_y$ alloy (0<x≤2, 0<y≤1.5), or a $Ge_xTe_y$ alloy (0<x≤1, 0<y≤1).

The metal alloy can be at least one alloy of $Ge_1Te_1$, $Ge_{0.35}Te_{0.65}(Ge_{0.7}Te_{1.3})$, $Ge_{0.5}Te_1(Ge_1Te_2)$, $Ge_{0.54}Te_1$ $(Ge_{1.08}Te_2)$, $Ge_{0.6}Te_1(Ge_{1.2}Te_2)$, $Ge_{0.65}Te_1(Ge_{1.3}Te_2)$, $Ge_{0.7}Te_1(Ge_{1.4}Te_2)$, $Ge_{0.75}Te_1(Ge_{1.5}Te_2)$, $Ge_{0.8}Te_1$ $(Ge_{1.6}Te_2)$, $Ge_{0.85}Te_1(Ge_{1.7}Te_2)$, $Ge_{0.9}Te_1(Ge_{1.8}Te_2)$, $Ge_{0.95}Te_1(Ge_{1.9}Te_2)$, $Ga_2Te_3$, $TeZn_2$, $Bi_2Te_3$, GeSe, $Sb_2Te_3$, $Bi_{14}Te_6$, Te—Pb, $AuTe_2$, $As_4Te_3$, $As_2Te_3$, SnTe, SrTe, $Y2Te_3$, $ZrTe_5$, $NbTe_2$, $MoTe_2$, $Ag_2Te$, CdTe, $In_2Te_3$, SnTe, $PdTe_2$, Bi—Sb—Te, Bi—Se—Te, Se—Sb—Te, Ge—Sb—Te, or Ge—Sb—Se—Te.

The mixing molar ratio of M1 and M2 in the metal alloy M1M2 can be about 1:1 to about 1:500, about 1:1 to about 1:300, about 1:1 to about 1:200, about 1:5 to about 1:180, about 1:8 to about 1:100, or about 1:1.85 to about 1:50.

The metal alloy can be, for example, a Ge—Te binary alloy. Since the metal alloy has lower fluidity than a single-component metal such as silver, stable interfacial contact may be maintained during high-rate charging and discharging, and a phase in which Li diffusion is fast (e.g., a phase having a rhombohedral structure) may be maintained even after alloying/dealloying with Li, so that the metal alloy does not act as a kinetic barrier. Since the first anode active material layer includes the above-described M1M2 metal alloy, a short circuit of the all-solid secondary battery can be prevented, and cycle characteristics of the all-solid secondary battery can be improved.

When the metal alloy layer includes a Ge—Te alloy, the molar ratio of Ge and Te in the Ge—Te alloy before acid treatment can be about 2.5:1 to about 1:500, about 1:1 to about 1:500, about 1:1 to about 1:300, about 1:1 to about 1:200, about 1:5 to about 1:180, about 1:8 to about 1:150, or about 1:10 to about 1:130. The molar ratio of Ge and Te in the Ge—Te alloy after acid treatment can be about 1:1 to about 1:500, about 1:1.5 to about 1:100, about 1:5 to about 1:50, about 1:7 to about 1:30, or about 1:8 to about 1:20.

A lithium-ion reduction potential of the first anode active material layer can be greater than a reduction potential of the solid electrolyte. Since the lithium-ion reduction potential of the metal alloy included in the first anode active material layer during charging is greater than the reduction potential of the solid electrolyte, a reduction-decomposition reaction of the solid electrolyte can be suppressed. Accordingly, decomposition of the solid electrolyte at the interface between the solid electrolyte layer and the first anode active material layer 22 can be suppressed, and local deposition of lithium can also be suppressed, so that it is possible to form a lithium deposition layer having a uniform surface. As a result, since stability of the solid electrolyte layer is increased during a charging/discharging process and reversible deposition/dissolution of the lithium layer is possible, a short circuit of the all-solid secondary battery may be suppressed, and cycle characteristics of the all-solid secondary battery may be improved.

The lithium-ion reduction potential of the first anode active material layer is a potential at which a metal or metal alloy forming a compound or an alloy by reacting with lithium, or a material for forming the first anode active material layer, reduces lithium ions to form a lithium-metal alloy such as a solid solution. That is, the lithium-ion reduction potential thereof is a potential at which a metal alloy is maintained during a charging process. The reduction potential of the solid electrolyte is a potential at which a transition metal included in the solid electrolyte is reduced and thus a decomposition reaction of the solid electrolyte proceeds. The lithium-ion reduction potential of the first anode active material layer is, for example, about 0.05 V to about 0.6 V (vs. Li/Li⁺). Alternatively, the reduction potential of the solid electrolyte may refer to a reduction-decomposition potential of the solid electrolyte or a decomposition potential of the solid electrolyte. For example, the reduction potential of LLZO is about 0.05 V (vs. Li/Li⁺).

The thickness of the first anode active material layer 22 may be about 10 nanometers (nm) to about 500 nm, about 15 nm to about 480 nm, about 20 nm to about 450 nm, about 30 nm to about 420 nm, for example, about 50 nm to about 300 nm. When the thickness of the first anode active material layer 22 is within the above ranges, an all-solid secondary battery having improved resistance and capacity characteristics may be manufactured.

The first anode active material layer 22 is, for example, an inorganic layer that does not contain an organic material. Since the first anode active material layer 22 is an inorganic layer, for example, side reactions occurring due to an organic material in the charging/discharging process can be suppressed.

Figure 1B:
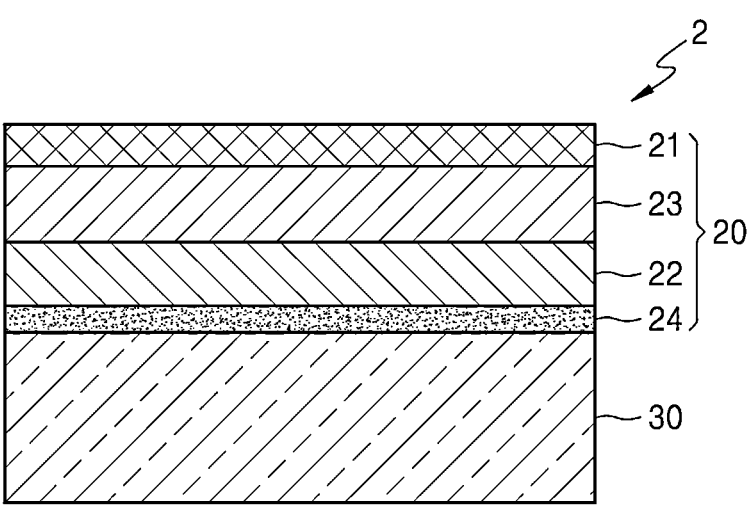
FIG. 1B shows a cross-section of another embodiment of an anode structure for an all-solid secondary battery.

The anode structure 2 of FIG. 1B is the same as the anode structure of FIG. 1A, except that the interlayer 24 is provided between the first anode active material layer 22 and the solid electrolyte 30.

The interlayer may include at least one oxide selected from lithium tellurium oxide, lithium selenium oxide, lithium tellurium alloy oxide, lithium selenium alloy oxide, or a combination thereof.

The interlayer may include at least one of a compound of Formula 1 below, or a compound of Formula 2 below:

$$Li(Te_aSe_{1-a})_xM_yOz \qquad \text{Formula 1}$$

wherein in Formula 1, M is at least one of Ge, Si, Sn, Al, Zn, Mg, Pb, As, Na, Bi, Ti, B, W, Mn, Fe, Ni, Cu, Cr, Zr, Ce, Sb, Ga, Au, Sr, Y, Nb, Mo, Ag, or In, and 0<a≤1, 0<x≤6, 0≤y≤14 and 0<z≤1 are satisfied, $$Li(Se_aTe_{1-a})_xM_yOz \qquad \text{Formula 2}$$

wherein, in Formula 2, M is at least one of Ge, Si, Sn, Al, Zn, Mg, Pb, As, Na, Bi, Ti, B, W, Mn, Fe, Ni, Cu, Cr, Zr, Ce, Sb, Ga, Au, Sr, Y, Nb, Mo, Ag, or In, and 0<a≤1, 0<x≤6, 0≤y≤14, and 0<z≤1 are satisfied.

The lithium tellurium alloy oxide is, for example, $LiTe_xGe_yO_1$ (0<x≤1, 0≤y<1).

The lithium selenium alloy oxide is, for example, $LiSe_xGe_yO_1$ (0<x≤1, 0≤y<1).

In the lithium tellurium alloy oxide, tellurium is a main component, and the content of tellurium (Te) is about 37 parts by weight to about 74 parts by weight, based on 100 parts by weight of the total weight of the lithium tellurium alloy oxide. The lithium tellurium alloy oxide is, for example, lithium tellurium germanium oxide.

The materials for the interlayer are ionic conductors. The thickness of the interlayer is about 10 nm or less, for example, about 1 nm to about 10 nm. When the interlayer having such a composition and thickness is formed, the bonding force between the anode layer and the solid electrolyte layer is further improved, so that current concentration may be prevented, and thus a short circuit, may be effectively prevented.

At least one of C, Cl, O, P, OH, S, or $SO_3$ may be present on the surface of the first anode active material layer. The at least one of C, Cl, O, P, OH, S, or $SO_3$ can be produced by an acid treatment process, and may be observed through SEM/energy dispersive X-ray spectroscopy (EDX), X-ray photoelectron spectroscopy (XPS), or the like.

The interlayer may be simultaneously formed during the pore formation process of the first anode active material layer. Alternatively, the interlayer may be formed through another separate process.

During the acid treatment of the first anode active material layer, among the components of the first anode active material layer, the component Ge of the M1M2 metal alloy is mainly removed. As a result, the interlayer includes a Li—Te—Ge compound, a Li—Te compound, a Li—Ge compound, a Li—Te—O compound, a Li—Ge—O compound, a Li—Te—Ge—O compound, or a combination thereof. In the Li—Te—Ge compound and the Li—Te—Ge—0 compound, the content of Ge is less than the content of Te. For example, the content of Ge is about 0.1 mole percent (mol %) to about 50 mol %, or about 1 mol % to about 40 mol %, and the content of Te is about 20 mol % to about 90 mol %, or about 30 mol % to about 80 mol %, both based on a total content of first anode active material layer. These contents may be confirmed by EDS or XPS analysis.

The thickness ratio of the first anode active material layer and the second anode active material layer is, for example, about 1:50 to about 1:100, or about 1:60 to about 1:90.

FIGS. 2A, 2B, and 3 to 5 show structures of all-solid batteries according to embodiments.

Figure 2A:
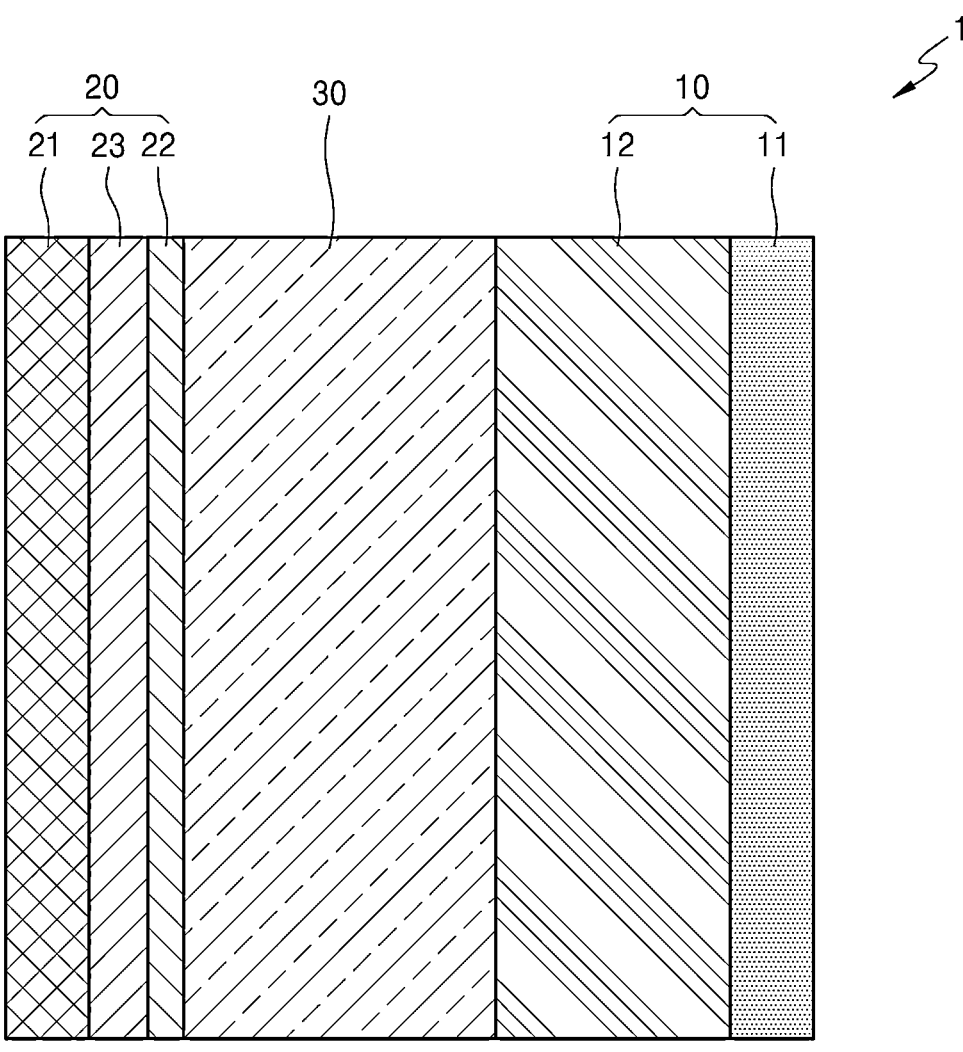
FIGS. 2A and 2B are cross-sectional views of an embodiment of an all-solid secondary battery.

Referring to FIG. 2A, an all-solid secondary battery 1 includes: a cathode layer 10 including a cathode active material layer 12; an anode layer 20; and a solid electrolyte layer 30 disposed between the cathode layer 10 and the anode layer 20 and including a solid electrolyte, wherein the anode layer 20 includes an anode current collector 21, a first anode active material layer 22 disposed on the anode current collector 21 and contacting the solid electrolyte layer 30, and a second anode active material layer 23 disposed between the anode current collector 21 and the first anode active material layer 22.

The first anode active material layer 22 includes a metal or a metal alloy that forms an alloy or a compound with lithium, and the second anode active material layer 23 includes a carbon anode active material or a carbon anode active material and a metal.

The lithium-ion diffusion coefficient of the first anode active material layer 22 may be selected to be about $1\times10^{-14}$ square centimeters per second ($cm^2$/sec) or more at 25° C., or about $1\times10^{-14}$ $cm^2$/sec to about $1\times10^{-8}$ $cm^2$/sec at 25° C. Further, the lithium-ion diffusion coefficient of the first anode active material layer 22 may be selected to be equal to or greater than the lithium-ion diffusion coefficient in the second anode active material layer 23.

While not wanting to be bound by theory, it is understood that because the first anode active material layer 22 has a greater lithium-ion diffusion coefficient, lithium introduced into the first anode active material layer 22 quickly moves to the second anode active material layer 23, so that it is possible to prevent the local deposition of lithium inside the first anode active material layer 22 or at the interface between the first anode active material layer 22 and the solid electrolyte layer 30. The lithium-ion diffusion coefficient of the first anode active material layer 22 at 25° C. may be, for example, about $1\times10^{-14}$ $cm^2$/sec or more, about $1\times10^{-13}$ $cm^2$/sec or more, about $1\times10^{-12}$ $cm^2$/sec or more, about $1\times10^{-11}$ $cm^2$/sec or more, about $1\times10^{-10}$ $cm^2$/sec or more, or about $5\times10^{-10}$ $cm^2$/sec or more. The lithium-ion diffusion coefficient of the first anode active material layer 22 at 25° C. may be about $1\times10^{-8}$ $cm^2$/sec or less or about $1\times10^{-9}$ $cm^2$/sec or less. The lithium-ion diffusion coefficient of the second anode active material layer 23 at 25° C. may be, for example, about $1\times10^{-15}$ $cm^2$/sec or more, about $1\times10^{-14}$ $cm^2$/sec or more, about $1\times10^{-13}$ $cm^2$/sec or more, about $1\times10^{-12}$ $cm^2$/sec or more, about $1\times10^{-11}$ $cm^2$/sec or more, or about $5\times10^{-11}$ $cm^2$/sec or more. The lithium-ion diffusion coefficient of the second anode active material layer 23 at 25° C. may be about $1\times10^{-9}$ $cm^2$/sec or less or about $1\times10^{-10}$ $cm^2$/sec or less. The lithium-ion diffusion coefficient of the second anode active material layer at 25° C. may be about 5 to about 1000, or about 10 to about 500, or about 10 times less than the lithium-ion diffusion coefficient of the first anode active material layer.

The lithium-ion reduction potential of the metal alloy M1M2 constituting the first anode active material layer 22 can be selected to be greater than the reduction potential of the solid electrolyte of the solid electrolyte layer 30. The difference between the lithium-ion reduction potential of the first anode active material layer 22 and the reduction potential of the solid electrolyte is selected to be, for example, about 0.01 V or more, about 0.02 V or more, about 0.05 V or more, about 0.1 V or more, about 0.2 V or more, or about 0.3 V or more. The difference between the lithium-ion reduction potential of the first anode active material layer 22 and the reduction potential of the solid electrolyte can be selected to be about 1 V or less, or about 0.5 V or less, e.g., about 0.01 V to about 1V, or about 0.1 V to about 0.5 V. When the difference between the lithium-ion reduction potential of the first anode active material layer 22 and the reduction potential of the solid electrolyte is within the above ranges, during charging and discharging, the reduction-decomposition reaction of the solid electrolyte can be effectively suppressed.

The lithium-ion reduction potential of the first anode active material layer 22 can be, for example, about 0.05 V or more, about 0.1 V or more, about 0.2 V or more, about 0.3 V or more, about 0.4 V or more, or about 0.5 V or more with respect to lithium metal. The lithium-ion reduction potential of the first anode active material layer 22 can be, about 1.5 V or less or about 1 V or less with respect to lithium metal. Since the first anode active material layer 22 has such a high lithium-ion reduction potential, the decomposition reaction of the solid electrolyte can be suppressed. Further, the lithium-ion reduction potential of the metal alloy in the first anode active material layer 22 is, for example, about 0.05 V or more, about 0.1 V or more, about 0.2 V or more, about 0.3 V or more, about 0.4 V or more, or about 0.5 V or more with respect to lithium metal. The lithium-ion reduction potential of the metal alloy of the first anode active material layer 22 can be, about 1.5 V or less or about 1 V or less with respect to lithium metal. Since the metal alloy included in the first anode active material layer 22 has such a high lithium-ion reduction potential, the decomposition reaction of the solid electrolyte can be suppressed. The reduction potential or reduction-decomposition potential of the solid electrolyte included in the solid electrolyte layer 30 can be, for example, about 0.2 V or less, about 0.1 V or less, about 0.09 V or less, about 0.07 V or less, about 0.05 V or less, about 0.03 V or less, about 0.02 V or less, or about 0.01 V or less with respect to lithium metal. Since the solid electrolyte has such a low reduction potential, the solid electrolyte can provide a wider electrochemically-stable voltage window.

The lithium-ion reduction potential of the first anode active material layer 22 may be greater than the lithium-ion reduction potential of the second anode active material layer 23. For example, the difference between the lithium-ion reduction potential of the first anode active material layer 22 and the lithium-ion reduction potential of the second anode active material layer 23 can be, for example, about 0.01 V or more such as 0.01 V to about 1.5 V, about 0.02 V or more such as about 0.02 V to about 1.2 V, about 0.05 V or more such as about 0.05 V to about 1.2 V, about 0.1 V or more such as 0.1 V to about 1 V, about 0.2 V or more such as about 0.2 V to about 0.8 V, or about 0.3 V or more such as about 0.3 V to about 0.8 V. While not wanting to be bound by theory, it is understood that because the first anode active material layer 22 has a greater lithium-ion reduction potential than the second anode active material layer 23, even when the lithium-ion reduction potential of the second anode active material layer 23 is less than the reduction potential of the solid electrolyte, the reduction-decomposition reaction of the solid electrolyte may be effectively suppressed by the first anode active material layer 22. The second metal included in the second anode active material layer 23 may be selected within a range having a lower lithium-ion reduction potential than the first anode active material layer 22 including a metal alloy. For example, the lithium-ion reduction potential of Ge—Te as the metal alloy is about 0.05 V to about 0.6 V. For example, the lithium-ion reduction potential of silver (Ag) as the second metal is about 0.2 V.

Alternatively, the lithium-ion reduction potential of the first anode active material layer 22 may be lower than the lithium-ion reduction potential of the second anode active material layer 23. If the lithium-ion reduction potential of the first anode active material layer 22 is greater than the reduction potential of the solid electrolyte, the lithium-ion reduction potential of the first anode active material layer 22 may be less than the lithium-ion reduction potential of the second anode active material layer 23.

The first anode active material layer 22 may include only a metal or a metal alloy when assembling a battery, or may be a metal or metal alloy layer including lithium.

The thicknesses of the first anode active material layer 22 and the second anode active material layer 23 can each independently be, for example, about 50% or less, about 40% or less, about 30% or less, about 20% or less, or about 10% or less of the thickness of the cathode active material layer 12.

The thicknesses of the first anode active material layer 22 and the second anode active material layer 23 can each independently be, for example about 0.1% to about 50%, about 3% to about 50% of the thickness of the cathode active material layer 12.

As the first anode active material layer 22 and/or the second anode active material layer 23 becomes thinner than the cathode active material layer 12, the energy density of the all-solid secondary battery may be improved.

The thickness of the first anode active material layer 22 is about 10 nm to about 500 nm, about 15 nm to about 480 nm, about 20 nm to about 450 nm, about 30 nm to about 420 nm, for example, about 50 nm to about 300 nm. The thickness of the second anode active material layer 23 is, for example, about 1 nm to about 100 μm, about 10 nm to about 100 μm, about 100 nm to about 10 μm, about 1 μm to about 100 μm, about 5 μm to about 90 μm, about 10 μm to about 80 μm, about 15 μm to about 80 μm, about 20 μm to about 70 μm, about 20 μm to about 55 μm, about 1 nm to about 500 nm, about 10 nm to about 500 nm, about 10 nm to about 400 nm, about 10 nm to about 300 nm, about 10 nm to about 150 nm, or about 10 nm to about 100 nm. When each of the first anode active material layer 22 and the second anode active material layer 23 has a thickness within the above ranges, short circuit of the all-solid secondary battery may be suppressed, and cycle characteristics of the all-solid secondary battery can be improved. The first anode active material layer 22 and/or the second anode active material layer 23 may be disposed by, for example, a vacuum deposition method, a sputtering method, a plating method, or the like, but the present disclosure is not necessarily limited thereto. Any method may be used as long as it may form an anode active material layer in the art.

The second anode active material layer 23 includes, for example, a particle-shaped anode active material and a binder.

The average particle diameter of the particle-shaped anode active material included in the second anode active material layer 23 is, for example, about 4 μm or less, about 3 μm or less, about 2 μm or less, about 1 μm or less, or about 900 nm or less. The average particle diameter of the particle-shaped anode active material is, for example, about 10 nm to about 4 μm, about 10 nm to about 2 μm, about 10 nm to about 1 μm, or about 10 nm to about 900 nm. When the average particle diameter of the particle-shaped anode active material is within the above ranges, during charging and discharging, reversible absorption and/or desorption of lithium may be more easily performed. The average particle diameter of the second anode active material is, for example, a median diameter (D50) measured using a laser particle size distribution meter.

The particle-shaped anode active material included in the second anode active material layer 23 includes i) a carbon anode active material or ii) a carbon anode active material and at least one selected from metal or metalloid anode active materials.

The carbon anode active material having a particle shape is particularly amorphous carbon. Examples of amorphous carbon may include, but are not limited to, carbon black (CB), acetylene black (AB), furnace black (FB), ketjen black (KB), and graphene. Any amorphous carbon may be used as long as it is classified as amorphous carbon in the art. Amorphous carbon is carbon that does not have crystallinity or has very low crystallinity, and is distinguished from crystalline carbon or graphite-based carbon.

The particle-shaped metal or metalloid anode active material includes at least one of indium (In), silicon (Si), gallium (Ga), tin (Sn), aluminum (Al), titanium (Ti), zirconium (Zr), niobium (Nb), germanium (Ge), antimony (Sb), Bismuth (Bi), zinc (Zn), gold (Au), platinum (Pt), palladium (Pd), iron (Fe), cobalt (Co), chromium (Cr), magnesium (Mg), cerium (Ce), or lanthanum (La). The particle-shaped metal or metalloid anode active material included in the second anode active material layer 23 can include at least one of gold (Au), platinum (Pt), palladium (Pd), silicon (Si), silver (Ag), aluminum (Al), bismuth (Bi), tin (Sn), or zinc (Zn). For example, since nickel (Ni) does not form an alloy with lithium, it is not a metal or metalloid anode active material of the second anode active material layer 23.

The second anode active material layer 23 can include, for example, a kind of anode active material among the particle-shaped anode active materials, or a mixture of a plurality of different kinds of particle-shaped anode active materials. For example, the second anode active material layer 23 can include only first particles made of amorphous carbon, or include second particles made of at least one of indium (In), silicon (Si), gallium (Ga), tin (Sn), aluminum (Al), titanium (Ti), zirconium (Zr), niobium (Nb), germanium (Ge), antimony (Sb), Bismuth (Bi), zinc (Zn), gold (Au), platinum (Pt), palladium (Pd), iron (Fe), cobalt (Co), chromium (Cr), magnesium (Mg), cerium (Ce), or lanthanum (La).

The second anode active material layer 23 can include a mixture of first particles made of amorphous carbon and second particles made of at least one metal alloy of indium (In), silicon (Si), gallium (Ga), tin (Sn), aluminum (Al), titanium (Ti), zirconium (Zr), niobium (Nb), germanium (Ge), antimony (Sb), Bismuth (Bi), zinc (Zn), gold (Au), platinum (Pt), palladium (Pd), iron (Fe), cobalt (Co), chromium (Cr), magnesium (Mg), cerium (Ce), or lanthanum (La). The content of the second particles can be about 8 wt % to about 60 wt %, about 10 wt % to about 50 wt %, about 15 wt % to about 40 wt %, or about 20 wt % to about 30 wt %, based on the total weight of the mixture. When the content of the second particles is within the above ranges, for example, the cycle characteristics of the all-solid secondary battery 1 may be further improved.

For example, the second anode active material layer 23 can include only first particles made of amorphous carbon, or include second particles made of at least one of gold (Au), platinum (Pt), palladium (Pd), silicon (Si), silver (Ag), aluminum (Al), bismuth (Bi), tin (Sn), or zinc (Zn). Alternatively, the second anode active material layer 23 can include a mixture of first particles made of amorphous carbon and second particles made of at least one of gold (Au), platinum (Pt), palladium (Pd), silicon (Si), silver (Ag), aluminum (Al), bismuth (Bi), tin (Sn), or zinc (Zn). The mixing weight ratio of the first particles and the second particles such as silver in the mixture is, for example, about 10:1 to about 1:2, about 5:1 to about 1:1, or about 4:1 to about 2:1, but is not limited to this range. The mixing ratio thereof is selected depending on the characteristics of the all-solid secondary battery 1.

The anode active material included in the second anode active material layer 23 can include, for example, a mixture of first particles made of amorphous carbon and second particles made of a metal or metalloid. The mixture is a simple mixture of the first particles and the second particles or a mixture of the first particles and the second particles physically bound by a binder. The metal or metalloid can include, for example, at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). Alternatively, the metalloid is a semiconductor. The content of the second particles can be about 8 wt % to about 60 wt %, about 10 wt % to about 50 wt %, about 15 wt % to about 40 wt %, or about 20 wt % to about 30 wt %, based on the total weight of the mixture. When the content of the second particles is within the above ranges, for example, cycle characteristics of the all-solid secondary battery may be further improved.

The second anode active material layer 23 may further include, for example, a binder. Examples of the binder may include, but are not limited to, styrene-butadiene rubber (SBR), polytetrafluoroethylene, polyvinylidene fluoride, polyethylene, vinylidene fluoride/hexafluoropropylene copolymer, polyacrylonitrile, and polymethyl methacrylate. Any binder may be used as long as it is used in the art. The binder may be composed of a single binder or a plurality of different binders.

Since the second anode active material layer 23 includes a binder, the second anode active material layer 23 is stabilized on the anode current collector 21. Further, during the charging and discharging processes, cracks in the second anode active material layer 23 may be suppressed regardless of a change in volume of the second anode active material layer 23 and/or a change in relative position of the second anode active material layer 23. For example, when the second anode active material layer 23 does not include a binder, the second anode active material layer 23 may be easily separated from the anode current collector 21. If a portion of the second anode active material layer 23 is separated from the anode current collector 21 and makes contact with the solid electrolyte layer 30 due to the exposure of the anode current collector 21, a possibility of a short circuit can increase. The second anode active material layer 23 can be prepared by applying a slurry, in which a material constituting the second anode active material layer 23 is dispersed, onto the anode current collector 21 and drying the slurry. It is possible to stably disperse the anode active material in the slurry by including the binder in the second anode active material layer 23. For example, when the slurry is applied onto the anode current collector 21 by screen printing, it is possible to prevent the clogging of a screen (for example, clogging of a screen by aggregates of the anode active material).

The anode current collector 21 can be made of, for example, a material that does not react with lithium, that is, does not form either an alloy or a compound with lithium. Examples of the material constituting the anode current collector 21 may include, but are not limited to, copper (Cu), stainless steel, titanium (Ti), iron (Fe), cobalt (Co), and nickel (Ni). Any material may be used as long as it is used to make an electrode current collector in the art. The anode current collector 21 may be made of one of the above-described metals, or may be made of an alloy of two or more metals or a coating material. The anode current collector 21 is made in the form of a plate shape or a foil shape.

The second anode active material layer 23 may further include additives such as a filler, a dispersant, and an ion conducting agent, which are used in the conventional all-solid secondary battery.

The thickness of the first anode active material layer 22 and/or the second anode active material layer 23, including the particle-shaped anode active material can be, for example, about 50% or less, about 40% or less, about 30% or less, about 20% or less, or about 10% or less of the thickness of the cathode active material layer 12. Since the thickness of the first anode active material layer 22 and/or the second anode active material layer 23 is thinner than that of the cathode active material layer 12, energy density of the all-solid secondary battery 1 may be improved.

Figure 2B:
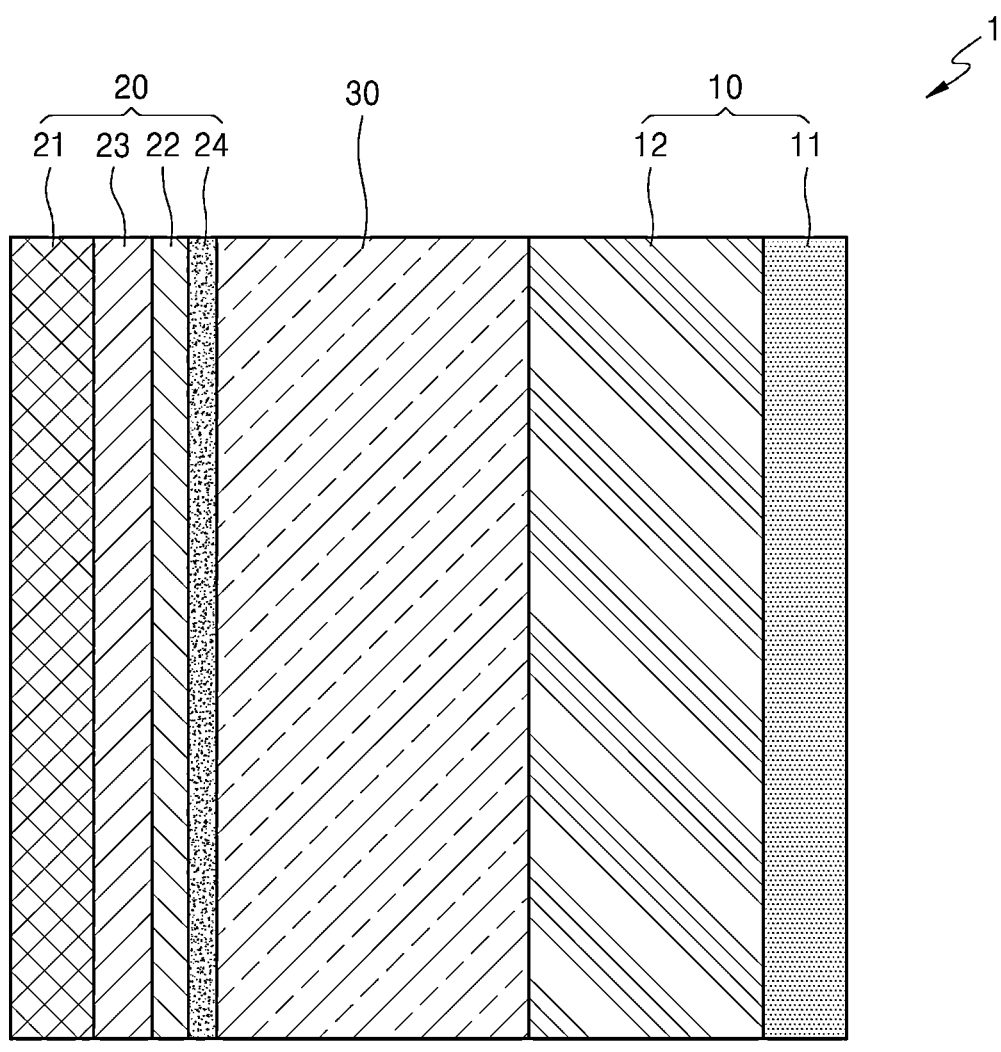
Figure 3:
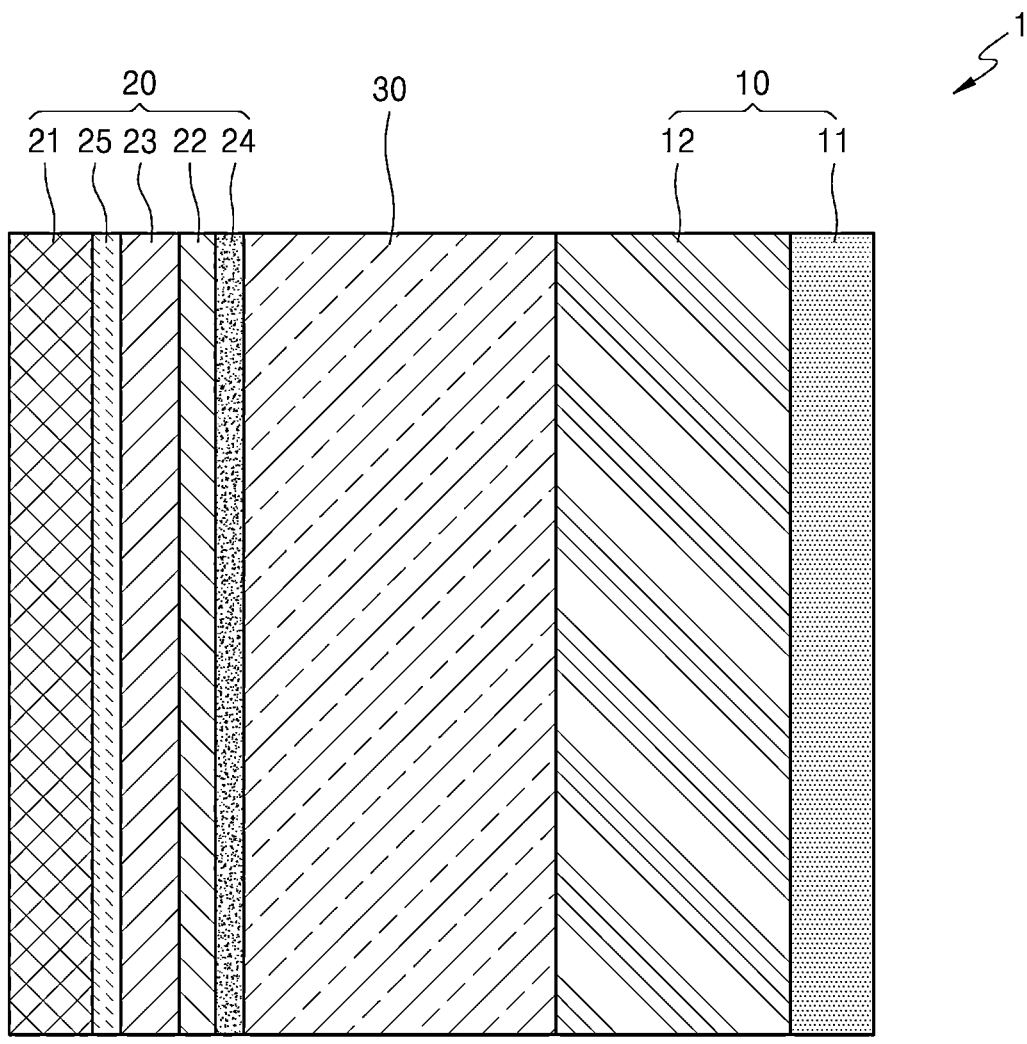
FIG. 3 is a cross-sectional view of another embodiment of an all-solid secondary battery.
Figure 4:
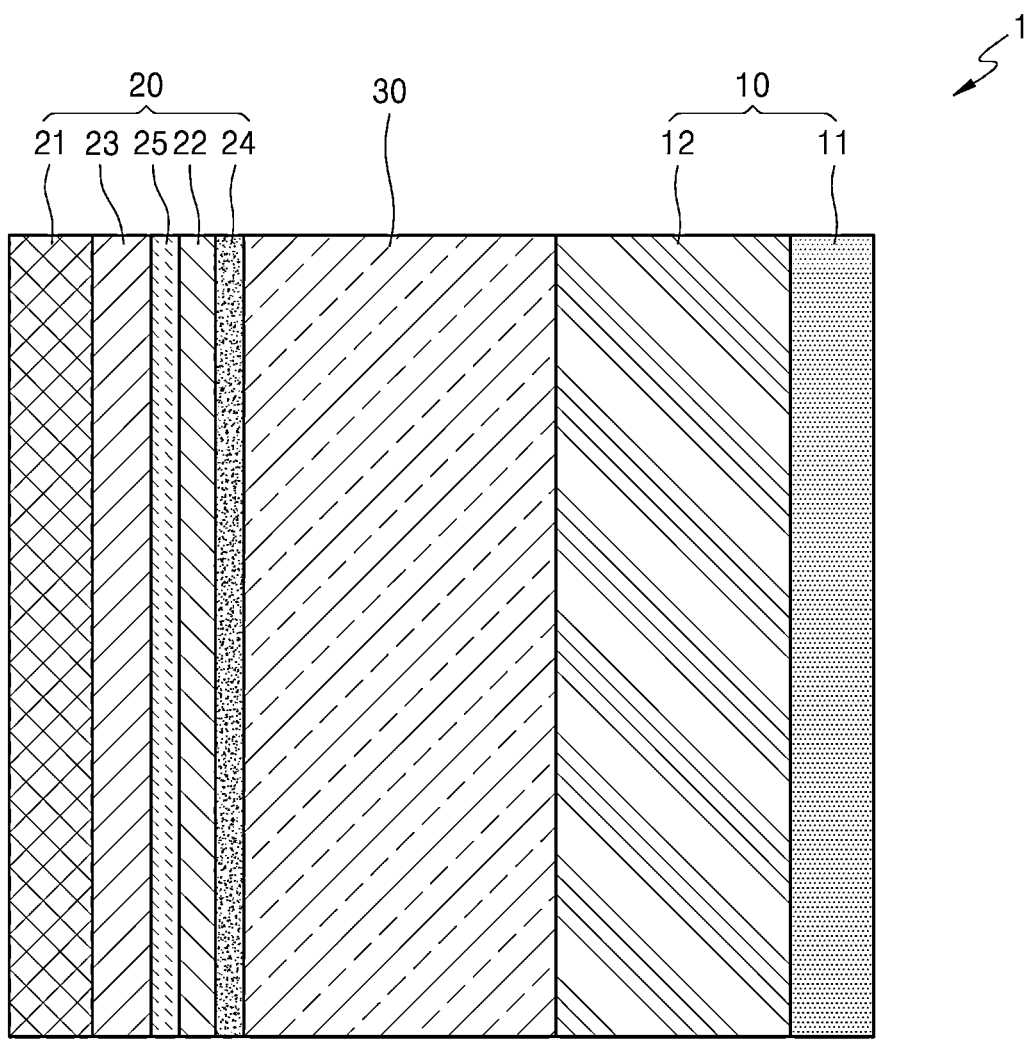
FIG. 4 is a cross-sectional view of another embodiment of an all-solid secondary battery.

Referring to FIGS. 2B, 3, and 4, an interlayer 24 is disposed between the first anode active material layer 22 and the solid electrolyte layer 30. Since the interlayer 24 contains an ionically conductive material, the bonding force between the anode layer and the solid electrolyte layer can be further improved, so that current concentration may be prevented and short circuit may be effectively prevented.

Referring to FIGS. 3 and 4, in the all-solid secondary battery 1, for example, a third anode active material layer 25 can be disposed between the anode current collector 21 and the second anode active material layer 23 or between the first anode active material layer 22 and the second anode active material layer 23. The third anode active material layer 25 can be a metal layer including lithium or a lithium alloy. The metal layer can include lithium or a lithium alloy. The third anode active material layer 25 may be formed by charging. Accordingly, since the third anode active material layer 25 is a metal layer containing lithium, it can function as, for example, a lithium reservoir. Examples of the lithium alloy may include, but are not limited to, a Li—Al alloy, a Li—Sn alloy, a Li—In alloy, a Li—Ag alloy, a Li—Au alloy, a Li—Zn alloy, a Li—Ge alloy, and a Li—Si alloy. Any suitable lithium alloy may be used as long as it is used in the art. The third anode active material layer 25 may be made of one of these alloys or lithium, or may be made of several kinds of alloys.

The thickness of the third anode active material layer 25 is not particularly limited, but is, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness of the third anode active material layer 25 is within the above ranges, cycle characteristics may be improved while serving as a lithium reservoir. The third anode active material layer 25 may be, for example, a metal foil having a thickness within these ranges.

In the all-solid secondary battery 1, before assembly of the all-solid secondary battery 1, the third anode active material layer 25 may be disposed between the anode current collector 21 and the second anode active material layer 23 or may be disposed between the first anode active material layer 22 and the second anode active material layer 23. According to another embodiment, in the all-solid secondary battery 1, after assembly of the all-solid secondary battery 1, the third anode active material layer 25 may be formed between the anode current collector 21 and the second anode active material layer 23 or between the first anode active material layer 22 and the second anode active material layer 23 by charging.

When the third anode active material layer 25 is disposed between the anode current collector 21 and the second anode active material layer 23 or between the first anode active material layer 22 and the second anode active material layer 23 before assembly of the all-solid secondary battery 1, since the third anode active material layer 25 is a metal layer including lithium, it can function as a lithium reservoir. Thus, the cycle characteristics of the all-solid secondary battery 1 including the third anode active material layer 25 may be further improved. For example, before assembly of the all-solid secondary battery 1, a lithium foil can be disposed between the anode current collector 21 and the second anode active material layer 23, or can be disposed between the first anode active material layer 22 and the second anode active material layer 23.

When the second anode active material layer 25 is disposed by charging after assembly of the all-solid secondary battery 1, the third anode active material layer 25 is not included during assembly of the all-solid secondary battery 1, so that the energy density of the all-solid secondary battery 1 increases. For example, when charging the all-solid secondary battery 1, the all-solid secondary battery 1 is charged to exceed the charging capacity of the first anode active material layer 22 and the second anode active material layer 23. That is, the first anode active material layer 22 and the second anode active material layer 23 are overcharged. At the initial stage of charging, lithium is absorbed in the first anode active material layer 22 and the second anode active material layer 23. That is, the anode active material included in the first anode active material layer 22 and the second anode active material layer 23 forms an alloy or compound with lithium ions that have migrated from the cathode layer 10. When the all-solid secondary battery 1 is charged to exceed the charging capacity of the first anode active material layer 22 and the second anode active material layer 23, for example, lithium can be deposited on the rear surface of the second anode active material layer 23, that is, between the anode current collector 21 and the second anode active material layer 23, and a metal layer corresponding to the third anode active material layer 25 is formed by the deposited lithium. Alternatively, when the all-solid secondary battery 1 is charged to exceed the charging capacity of the first anode active material layer 22 and the second anode active material layer 23, for example, lithium is deposited on the front surface of the second anode active material layer 23, that is, between the first anode active material layer 22 and the second anode active material layer 23, and a metal layer corresponding to the third anode active material layer 25 is formed by the deposited lithium. The third anode active material layer 25 can be a metal layer mainly including lithium (that is, metal lithium). Such a result is obtained, for example, when the anode active material included in the first anode active material layer 22 and the second anode active material layer 23 is composed of a material that forms an alloy or compound with lithium. During discharging, lithium in the first anode active material layer 22, the second anode active material layer 23, and the third anode active material layer 25, that is, the metal layer is ionized and moves toward the cathode layer 10. Accordingly, it is possible to use lithium as an anode active material in the all-solid secondary battery 1. Further, since the first anode active material layer 22 and/or the second anode active material layer 23 covers the third anode active material layer 25, the first anode active material layer 22 and/or the second anode active material layer 23 can serve as a protective layer for the third anode active material layer 25, that is, the metal layer, and serves to suppress the deposition growth of lithium dendrites. Therefore, the short circuit and capacity reduction of the all-solid secondary battery 1 can be suppressed, and as a result, the cycle characteristics of the all-solid secondary battery 1 may be improved.

The thickness of the first anode active material layer 22 may be, for example, about 5% to about 150%, about 10% to about 120%, about 20% to about 100%, about 30% to about 80%, or about 33% to about 66% of the thickness of the third anode active material layer 25 in a state after charging. When the first anode active material layer 22 is too thin, it may be difficult to function as the first anode active material layer 22. When the first anode active material layer 22 is too thick, the energy density of the all-solid secondary battery 1 may be reduced.

Further, when the third anode active material layer 25 is disposed by charging after assembly of the all-solid secondary battery 1, the anode current collector 21, the first anode active material layer 22, the second anode active material 23, and the region therebetween can be, for example, Li-free regions that do not include lithium (Li) in the initial state or post-discharge state of the all-solid secondary battery.

Figure 5:
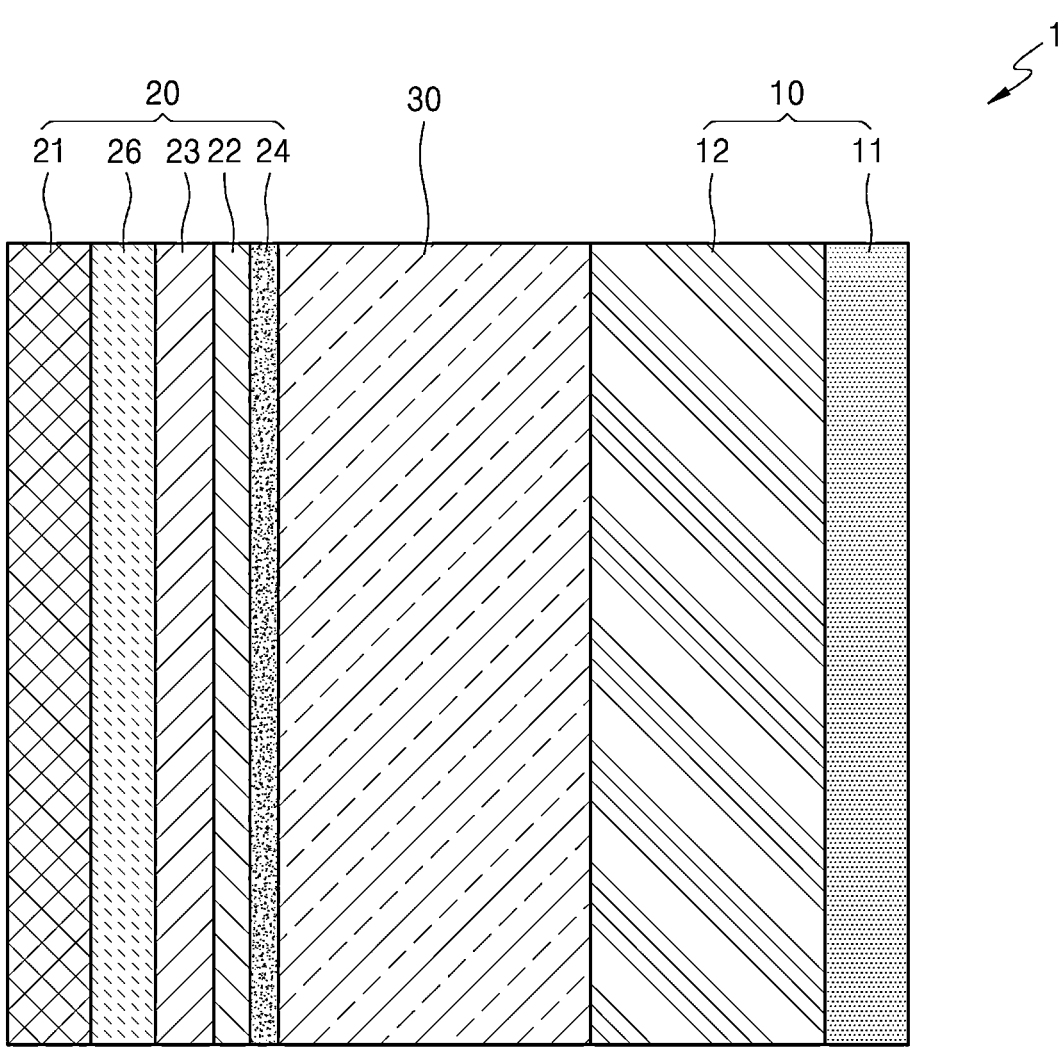
FIG. 5 is a cross-sectional view of another embodiment of an all-solid secondary battery.

In FIG. 5, reference numeral 26 denotes a fourth anode active material layer. The fourth anode active material layer may be made of a material different from that of the third anode active material layer.

Sold Electrolyte Layer

Referring to FIGS. 2A, 2B, and 3 to 5, the solid electrolyte layer 30 includes a solid electrolyte between the cathode layer 10 and the anode layer 20.

The solid electrolyte may be, for example, at least one of an oxide-based solid electrolyte (also referred to as "oxide solid electrolyte"), or a sulfide-based solid electrolyte (also referred to as "sulfide solid electrolyte"). The oxide-based solid electrolyte is at least selected from $Li_{1+x+y}Al_x$ $Ti_{2-x}Si_yP_{3-y}O_{12}$ ($0<x<2$, $0\leq y<3$), $BaTiO_3$, $Pb(Zr_xTi_{1-x})O_3$ (PZT, $0\leq a\leq 1$), $Pb_{1-x}La_xZr_{1-y}Ti_yO_3$(PLZT) ($0\leq x<1$, $0\leq y<1$), Pb(Mg$_{1/3}$Nb$_{2/3}$) O$_3$—PbTiO$_3$(PMN-PT), HfO$_2$, SrTiO$_3$, SnO$_2$, CeO$_2$, Na$_2$O, MgO, NiO, CaO, BaO, ZnO, ZrO$_2$, Y$_2$O$_3$, Al$_2$O$_3$, TiO$_2$, SiO$_2$, Li$_3$PO$_4$, Li$_x$Ti$_y$(PO$_4$)$_3$ (0<x<2, 0<y<3), Li$_x$Al$_y$Ti$_z$(PO$_4$)$_3$ (0<x<2, 0<y<1, 0<z<3), Li$_{1+x+y}$(Al$_a$Ga$_{1-a}$)$_x$(Ti$_b$Ge$_{1-b}$)$_{2-x}$Si$_y$P$_{3-y}$O$_{12}$ (0≤x≤1 0≤y≤1, 0≤a≤1, and 0≤b≤1), Li$_x$La$_y$TiO$_3$ (0<x<2, 0<y<3), Li$_2$O, LiOH, Li$_2$CO$_3$, LiAlO$_2$, Li$_2$O—Al$_2$O$_3$—SiO$_2$—P$_2$O$_5$—TiO$_2$—GeO$_2$, or Li$_{3+x}$La$_3$M$_2$O$_{12}$ (M=at least one of Te, Nb, or Zr, x is an integer of 1 to 10). The solid electrolyte is produced by sintering or the like. For example, the oxide-based solid electrolyte is a garnet-type solid electrolyte selected from Li$_7$La$_3$Zr$_2$O$_{12}$ (LLZO) or Li$_{3+x}$La$_3$Zr$_{2-a}$M$_a$O$_{12}$ (M doped LLZO, M=Ga, W, Nb, Ta, or Al, x is an integer of 1 to 10).

Alternatively, the solid electrolyte is, for example, a sulfide-based solid electrolyte. The sulfide-based solid electrolyte can be, for example, at least one selected from P$_2$S$_5$, Li$_2$S—P$_2$S$_5$—LiX (where X is a halogen element), Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$ (where m and n are each a positive number, and Z is one selected from Ge, Zn and Ga), Li$_2$S—GeS$_2$, Li$_2$S—SiS$_2$—Li$_3$PO$_4$, Li$_2$S—SiS$_2$—Li$_p$MO$_q$ (where p and q are each a positive number, and M is one selected from P, Si, Ge, B, Al, Ga, and In), Li$_{7-x}$PS$_{6-x}$Cl$_x$ (0≤x≤2), Li$_{7-x}$PS$_{6-x}$Br$_x$ (0≤x≤2), or Li$_{7-x}$PS$_{6-x}$I$_x$ (0≤x≤2). The sulfide-based solid electrolyte can be prepared by treating a starting material such as Li$_2$S or P$_2$S$_5$ by a melt quenching method or a mechanical milling method. After this treatment, heat treatment may be performed. The solid electrolyte may be amorphous, crystalline, or a mixed state thereof.

The solid electrolyte may include sulfur (5), phosphorus (P), and lithium (Li) as at least constituent elements among the above-described sulfide-based solid electrolyte materials. For example, the solid electrolyte may be a material including Li$_2$S—P$_2$S$_5$. When a solid electrolyte including Li$_2$S—P$_2$S$_5$ as a material of the sulfide-based solid electrolyte forming the solid electrolyte, the mixing molar ratio of Li$_2$S and P$_2$S$_5$ is, for example, in the range of Li$_2$S:P$_2$S$_5$=about 50:50 to about 90:10.

The sulfide-based solid electrolyte may be a compound having an argyrodite crystal structure. The compound having an argyrodite crystal structure can include at least one selected from Li$_{7-x}$PS$_{6-x}$Cl$_x$(0<x<2), Li$_{7-x}$PS$_{6-x}$Br$_x$ (0<x<2), or Li$_{7-x}$PS$_{6-x}$I$_x$(0<x<2). In particular, the sulfide-based solid electrolyte included in the solid electrolyte may be an argyrodite-type compound including at least one selected from Li$_6$PS$_5$Cl, Li$_6$PS$_5$Br, or Li$_6$PS$_5$I.

The solid electrolyte layer 30 further includes, for example, a binder. Examples of the binder included in the solid electrolyte layer 30 may include, but are not limited to, styrene butadiene rubber (SBR), polytetrafluoroethylene, polyvinylidene fluoride, and polyethylene. Any suitable binder may be used as long as it is used in the art. The binder included in the solid electrolyte layer 30 may be the same as or different from the binder included in the cathode active material layer 12 and the anode active material layer 22.

Cathode Layer

The cathode layer 10 includes a cathode current collector 11 and a cathode active material layer 12.

As the cathode current collector 11, for example, a plate or foil made of indium (In), copper (Cu), magnesium (Mg), stainless steel, titanium (Ti), iron (Fe), cobalt (Co), nickel (Ni), zinc (Zn), aluminum (Al), germanium (Ge), or an alloy thereof. The cathode current collector 11 may be omitted.

The cathode active material layer 12 includes, for example, a cathode active material.

The cathode active material can be a cathode active material capable of reversibly absorbing and desorbing lithium ions. The cathode active material can be, for example, a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), lithium manganate, lithium and iron phosphate, and a nickel sulfide, a copper sulfide, a lithium sulfide, an iron oxide, or a vanadium oxide, and the like, but is not limited thereto, and any suitable one available as a cathode active material in the art may be used. The cathode active materials may each be used alone or as a mixture of two or more thereof.

The cathode active material can be a compound represented by one of, for example, Li$_a$A$_{1-b}$B'$_b$D$_2$ (where 0.90≤a≤1, and 0≤b≤0.50; Li$_a$E$_{1-b}$B'$_b$O$_{2-c}$D$_c$ (where 0.90≤a≤1, 0≤b≤0.5, and 0≤c≤0.5); LiE$_{2-b}$B'$_b$O$_{4-c}$D$_c$ (where 0≤b≤0.5, and 0≤c≤0.05); Li$_a$Ni$_{1-b-c}$Co$_b$B'$_c$D$_\alpha$ (where 0.90≤a≤1, 0≤b≤0.5, 0≤c≤0.05, and 0<α≤2); Li$_a$Ni$_{1-b-c}$Co$_b$B'$_c$O$_{2-\alpha}$F'$_\alpha$ (where 0.90≤a≤1, 0≤b≤0.5, 0≤c≤0.05, and 0<α<2); Li$_a$Ni$_{1-b-c}$Co$_b$B'$_c$O$_{2-\alpha}$F'$_2$ (where 0.90≤a≤1, 0≤b≤0.5, 0≤c≤0.05, and 0<α<2); Li$_a$Ni$_{1-b-c}$Mn$_b$B'$_c$D$_\alpha$ (where 0.90≤1≤1, 0≤b≤0.5, 0≤c≤0.05, and 0<α≤2); Li$_a$Ni$_{1-b-c}$Mn$_b$B'$_c$O$_{2-\alpha}$F'$_\alpha$ (where 0.90≤a≤1, 0≤b≤0.5, 0≤c≤0.05, and 0<α<2); Li$_a$Ni$_{1-b-c}$Mn$_b$B'$_c$O$_{2-\alpha}$F'$_2$ (where 0.90≤a≤1, 0≤b≤0.5, 0≤c≤0.05, and 0<α<2); Li$_a$Ni$_b$E$_c$G$_d$O$_2$ (where 0.90≤a≤1, 0≤b≤0.9, 0≤c≤0.5, and 0.001≤d≤0); Li$_a$Ni$_b$Co$_c$Mn$_d$GeO$_2$ (where 0.90≤a≤1, 0≤b≤0.9, 0≤c≤0.5, 0≤d≤0.5, and 0.001≤e≤0.1); Li$_a$NiG$_b$O$_2$ (where 0.90≤a≤1, and 0.001≤b≤0.1); Li$_a$CoG$_b$O$_2$ (where 0.90≤a≤1 and 0.001≤b≤0.1); Li$_a$MnG$_b$O$_2$ (where 0.90≤a≤1 and 0.001≤b≤0.1); Li$_a$Mn$_2$G$_b$O$_4$ (where, 0.90≤a≤1 and 0.001≤b≤0.1); Li$_a$Ni$_b$Co$_c$Mn$_d$GeO$_2$ (where, 0.90≤a≤1, 0≤b≤0.9, 0≤c≤0.5, 0≤d≤0.5, and 0.001≤e≤0.1); Li$_a$NiG$_b$O$_2$ (where, 0.90≤a≤1 and 0.001≤b≤0.1); Li$_a$CoG$_b$O$_2$ (where, 0.90≤a≤1 and 0.991≤b≤0.1); Li$_a$MnG$_b$O$_2$ (where, 0.90≤a≤1 and 0.001≤b≤0.1); Li$_a$Mn$_2$G$_b$O$_4$ (where, 0.90≤a≤1 and 0.001≤b≤0.1); QO$_2$; QS$_2$; LiQS$_2$; V$_2$O$_5$; LiV$_2$O$_5$; LiI'O$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and LiFePO$_4$. In the compound, A is Ni, Co, Mn, or a combination thereof; B' is Al, Ni, Co, Mn, Cr, Fe, Mg, Sr, V, a rare earth element, or a combinations thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. A compound having a coating layer added on a surface thereof may be also used, and a mixture having the compound described above and the compound having a coating layer which are added thereto may be also used. The coating layer added to the surface of the compound can include, for example, a coating element compound of an oxide, a hydroxide, an oxyhydroxide, an oxycarbonate, or a hydroxycarbonate of the coating element. The compound forming the coating layer can be amorphous or crystalline. The coating elements included in the coating layer can be at least one selected from Mg, Al, Co, K, Na, Ca, Si, Ti, V, Sn, Ge, Ga, B, As, or Zr. A method of forming the coating layer can be selected within a range which does not adversely affect properties of the cathode active material. The coating method can be, for example, spraying, coating, or dipping. Since a specific coating method can be well understood by people in the art, detailed descriptions thereof will be omitted.

The cathode active material can include, for example, a lithium salt of a transition metal oxide having a layered rock salt type structure among the above-described lithium transition metal oxides. The "layered rock salt type structure", for example, is a structure wherein an oxygen atom layer and a metal atom layer are alternately and regularly arranged in the direction of <111> of a cubic rock salt type structure, whereby each atom layer forms a two-dimensional plane. "Cubic rock salt type structure" refers to a sodium chloride type (NaCl type) structure, which is a type of crystal structure, and, specifically, has a structure in which face-centered cubic lattices (FCCs) forming each of cations and anions are arranged to be displaced from each other by ½ of a ridge of a unit lattice. A lithium transition metal oxide having the layered rock salt type structure is a ternary lithium transition metal oxide, for example, $LiNi_xCo_yAl_zO_2$ (NCA) or $LiNi_xCo_yMn_zO_2$ (NCM) ($0<x<1$, $0<y<1$, $0<z<1$, $x+y+z=1$). When the cathode active material includes a ternary lithium transition metal oxide having a layered rock salt type structure, the energy density and thermal stability of the all-solid secondary battery 1 may be further improved.

The cathode active material may be covered by the coating layer as described above. The coating layer may be any one known as a coating layer of the cathode active material of the all-solid secondary battery. The coating layer can be, for example, $Li_2O$—$ZrO_2$ or the like.

When the cathode active material includes nickel (Ni) as a ternary lithium transition metal oxide such as NCA or NCM, the capacity density of the all-solid secondary battery 1 can be increased, whereby metal elution of the cathode active material in a charged state may be reduced. As a result, cycle characteristics of the all-solid secondary battery 1 may be improved.

The shape of the cathode active material can be, for example, a sphere or an elliptical sphere. The particle diameter of the cathode active material is not particularly limited and can be within a suitable range applicable to a conventional all-solid secondary battery. The content of the cathode active material in the cathode layer 10 is also not particularly limited and can be within a suitable range applicable to a conventional all-solid secondary battery.

The cathode layer 10 may further include additives such as at least one of a filler, a coating agent, a dispersing agent, or an ion-conductive auxiliary agent in addition to the above-described cathode active material, solid electrolyte, binder, and conductive material. Examples of the conductive material may include graphite, carbon black, acetylene black, Ketjen black, carbon fiber, and metal powder. Examples of the binder may include, but are not limited to, styrene butadiene rubber (SBR), polytetrafluoroethylene, polyvinylidene fluoride, and polyethylene. As the filler, coating agent, dispersing agent and ion-conductive auxiliary agent included in the cathode layer 10, suitable known materials generally used for electrodes of all-solid secondary batteries may be used.

The cathode layer 10 may further include a solid electrolyte. The solid electrolyte included in the cathode layer 10 is similar to or different from the solid electrolyte included in the solid electrolyte layer 30. For details on the solid electrolyte, refer to those of the solid electrolyte layer 30.

The solid electrolyte included in the cathode layer 10 can be, for example, at least one of an oxide-based solid electrolyte, or a sulfide-based solid electrolyte. As the sulfide-based solid electrolyte and the oxide-based solid electrolyte for the cathode layer 10, the sulfide-based solid electrolyte and the oxide-based solid electrolyte used in the solid electrolyte layer may be used.

Alternatively, the cathode layer 10 may be impregnated with a liquid electrolyte. The liquid electrolyte may include a lithium salt and at least one of an ionic liquid or a polymer ionic liquid. The liquid electrolyte may be non-volatile. The ionic liquid can have a melting point below room temperature, and refers to a liquid salt or molten salt including only ions at room temperature. The ionic liquid may be a compound including a) at least one cation selected from ammonium-based cations, pyrrolidinium-based cations, pyridinium-based cations, pyrimidinium-based cations, imidazolium-based cations, piperidinium-based cations, pyrazolium-based cations, oxazolium-based cations, pyridazinium-based cations, phosphonium-based cations, sulfonium-based cations, or triazolium-based cations, and b) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, or $(CF_3SO_2)_2N^-$. The ionic liquid can be, for example, at least one selected from N-methyl-N-propylpyrrolidium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)imide, or 1-ethyl-3-methylimidazolium bis(trifluoromethylsulfonyl)imide. The polymer ionic liquid can include a repeat unit including a) at least one cation selected from ammonium-based cations, pyrrolidinium-based cations, pyridinium-based cations, pyrimidinium-based cations, imidazolium-based cations, piperidinium-based cations, pyrazolium-based cations, oxazolium-based cations, pyridazinium-based cations, phosphonium-based cations, sulfonium-based cations, or triazolium-based cations, and b) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^{-2-}$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $CF_3SO_2)_2CH^-$, $(SF_5)_3C^-$, or $(OCF_3)_2C_2(CF_3)_2O)_2PO^-$. Any suitable lithium salt may be used. The lithium salt can be, for example, at least one salt of $LiPF_6^-$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlC_4$, $LiN(C_xF_{2x+1}SO2)(C_yF_{2y+1}SO_2)$ (x and y are each a natural number), $LiCl$, or $LiI$. The concentration of the lithium salt in the liquid electrolyte may be about 0.1 M to about 5 M. The content of the liquid electrolyte impregnated in the cathode layer 10 is about 0 or about 0.01 part by weight to about 100 parts by weight, about 0 or about 0.1 part by weight to about 30 parts by weight, about 0 or about 0.5 part by weight to about 10 parts by weight, or about 0 or about 0.5 part by weight to about 5 parts by weight, with respect to 100 parts by weight of the cathode active material layer 12 including no liquid electrolyte.

An all-solid secondary battery may be manufactured by the processes of: providing a solid electrolyte layer having a first surface and an opposite second surface; placing a first anode active material layer on the first surface of the solid electrolyte layer; forming pores in the first anode active material layer to prepare a porous first anode active material layer; providing an anode current collector and a second anode active material layer on the anode current collector; placing the anode current collector on the porous first anode active material layer; and placing a cathode active material layer on the second surface of the solid electrolyte layer to manufacture an all-solid secondary battery.

The process of forming the pores in the first anode active material layer can comprise treating the first anode active material layer with an acid or a pore former to form pores in the first anode active material layer. After the acid treatment, the first anode active material layer can have a porous structure with an increased surface area, so that the diffusion and migration of lithium ions into the second cathode active material layer is increased, and the bonding force between the solid electrolyte layer and the first anode active material layer is improved.

Any suitable material capable of forming pores in the first anode active material layer may be used as the pore former. For example, the pore former may include at least one of polyvinylpyrrolidone (PVP); polyethylene glycol, polyvinyl alcohol, diethyl glycol, polymethyl methacrylate (PMMA), or triethylene glycol.

In the process of placing the first anode active material layer on the first surface of the solid electrolyte layer, the first anode active material layer can be formed on a substrate, and then laminated on the solid electrolyte layer. The process of forming the first anode active material layer on the substrate can be performed by deposition such as sputtering, spin coating, drop coating, spray coating, or solution infiltration. The deposition may be performed, for example, by physiochemical vapor deposition.

The deposition can include at least one of sputtering, pulsed laser deposition (PLD), molecular beam epitaxy (MBE), ion plating, or ion beam deposition.

In the deposition, sputtering can be used, and examples of the sputtering can include DC sputtering, radio frequency (RF) sputtering, magnetron sputtering, bias sputtering, and reactive sputtering. According to an embodiment, RF sputtering may be used.

The substrate is not particularly limited, and for example, various supports may be used depending on the process of manufacturing a substrate or an anode electrode.

Examining the sputtering conditions, RF power can be about 300 W to about 500 W, power density can be about 2.5 $W/cm^2$ to about 2.6 $W/cm^2$, operation pressure can be about 3 mTorr to about 9 mTorr, and plasma gas, such as nitrogen gas or argon gas, can be used. The growth rate at which the first anode active material layer is formed on the substrate can be controlled to be about 0.3 Å/sec to about 0.4 Å/sec. The distance between the sputter target and the substrate can be about 50 mm to about 120 mm, and the deposition time can be about 100 minutes to about 1,000 minutes.

When the sputtering conditions are within the above ranges, a densified first anode active material layer may be formed. When the sputtering conditions are within the above ranges, a densified first anode active material layer in an amorphous or crystalline state may be formed.

After the above-described sputtering is performed, heat treatment may not be performed.

According to another embodiment, after the above-described sputtering is performed, heat treatment may be further performed at a temperature range of about 400° C. or less, about 100° C. to about 400° C., for example, about 200° C. to about 400° C. When the heat treatment is further performed as described above, the crystalline phase content of the first anode active material layer may increase.

After the process of disposing the first anode active material layer on the first surface of the solid electrolyte layer, a process of performing heat treatment at about 200° C. to about 400° C. may be further performed. When the heat treatment is further performed as described above, the crystallinity of the metal alloy is further improved.

As described above, when the first anode active material layer is formed, lithium ions may move smoothly.

Since the first anode active material layer 22 and the second anode active material layer 23 are sequentially arranged on the solid electrolyte layer 30, the short circuit of the all-solid secondary battery 1 may be suppressed, and the cycle characteristics of all-solid secondary battery 1 can be improved. The all-solid secondary battery 1 is manufactured by preparing the solid electrolyte layer 30, on which the first anode active material layer 22 and the second anode active material layer 23 are sequentially arranged, and the cathode layer 10, respectively, and then laminating these layers.

Manufacture of Laminate of Solid Electrolyte Layer/Anode Layer

The first anode active material layer may be prepared by applying a metal alloy onto one surface of the solid electrolyte layer by a method such as sputtering, vacuum deposition, or plating. Alternatively, the first anode active material layer may be prepared by arranging a foil of a metal alloy on one surface of the solid electrolyte layer and pressing the foil. The pressing can be, for example, roll pressing, flat pressing, warm isotactic pressing (WIP), or cold isotactic pressing (CIP), but is not necessarily limited to these methods. Any pressing or combinations of pressing may be used as long as it is used in the art. The pressure applied during the pressing can be, for example, about 50 MPa to about 500 MPa. The pressing time can be about 5 milliseconds to 10 min. The pressing can be performed, for example, at about room temperature to about 90° C., or about 20° C. to about 90° C. Alternatively, the pressing can be performed at a high temperature of about 100° C. or higher. The second anode active material layer may also be prepared in the same manner as the first anode active material layer, except that the second anode active material is used. A laminate of the solid electrolyte layer 30/anode layer 20 may be prepared by disposing an anode current collector on the second anode active material layer, disposing the solid electrolyte layer on the second anode active material layer, and then pressing the resultant structure. The pressing can be, for example, roll pressing, flat pressing, or the like, but is not necessarily limited to these methods. Any pressing may be used as long as it is used in the art. The pressure applied during the pressing can be, for example, about 50 MPa to about 500 MPa. The pressing time can be about 5 milliseconds to about 10 min. The pressing is performed, for example, at about room temperature to about 90° C., or about 20° C. to about 90° C. Alternatively, the pressing can be performed at a high temperature of about 100° C. or higher.

Alternatively, the second anode active material layer 23 may be prepared using a second anode active material slurry.

For example, a slurry can be prepared by adding second anode active material, a binder, and the like, which are materials constituting the second anode active material layer 23, to a polar solvent or a non-polar solvent. The prepared slurry can be applied onto the first anode active material layer 22 of the prepared laminate of the solid electrolyte layer 30/first anode active material layer 22, i.e. and the first laminate, and then dried to prepare a second laminate. Subsequently, the anode current collector 21 can be disposed on the prepared second laminate, and pressed by the above-described method to prepare a laminate of the solid electrolyte layer 30/anode layer 20.

Preparation of Cathode Layer

A cathode active material, a binder, and the like, which are materials constituting a cathode active material layer 12, can be added to a non-polar solvent to prepare a slurry. The prepared slurry can be applied on a cathode current collector 11 and dried to obtain a laminate. The obtained laminate can be pressed to prepare a cathode layer 10. The pressing can include roll pressing, flat pressing, or pressing using hydrostatic pressure, but is not limited thereto. Any pressing may be used as long as it is used in the art. The pressing process may be omitted. The cathode layer 10 can also be prepared by compact-molding a mixture of materials constituting the cathode active material layer 12 in a pellet form or extending (molding) the mixture in a sheet form. When the cathode layer 10 is prepared in this way, the cathode current collector 11 may be omitted. Alternatively, the cathode layer may be used by being impregnated with an electrolyte solution.

Preparation of Solid Electrolyte Layer

The solid electrolyte layer 30 including an oxide-based solid electrolyte is prepared by heat-treating a precursor of the oxide-based solid electrolyte.

The oxide-based solid electrolyte may be prepared by contacting precursors in a stoichiometric amount to form a mixture, and heat-treating the mixture. Examples of the contacting may include milling such as ball milling, and pulverizing. The mixture of precursors mixed with a stoichiometric composition may be subjected to primary heat treatment in an oxidizing atmosphere to prepare a primary heat treatment product. The primary heat treatment may be performed at a temperature range of less than about 1000° C. for about 1 hour to about 36 hours. The primary heat treatment product may be pulverized. The pulverization of the primary heat treatment product may be performed by dry pulverization or wet pulverization. The wet pulverization may be performed by mixing a solvent such as methanol and the primary heat treatment product and then milling the mixture using a ball mill for about 0.5 hours to about 10 hours. The dry pulverization may be performed by milling using a ball mill. The particle diameter of the pulverized primary heat treatment product may be about 0.1 μm to about 10 μm, or about 0.1 μm to about 5 μm. The pulverized primary heat treatment product may be dried. The pulverized primary heat treatment product may be mixed with a binder solution to be molded into pellets, or may be simply pressed at a pressure of about 1 ton to about 10 tons to be molded into pellets.

The molded product may be subjected to secondary heat treatment at a temperature of less than or equal to about 1000° C. for about 1 hour to about 36 hours. A solid electrolyte layer 30, which is a sintered product, can be obtained by the secondary heat treatment. The secondary heat treatment may be performed, for example, at about 550° C. to about 1000° C. The primary heat treatment time is about 1 hour to about 36 hours. In order to obtain a sintered product, secondary heat treatment temperature can be higher than the primary heat treatment temperature. For example, the secondary heat treatment temperature may be higher than the primary heat treatment temperature by 10° C. or higher, 20° C. or higher, 30° C. or higher, or 50° C. or higher. The molded product may be subjected to secondary heat treatment in at least one of an oxidizing atmosphere and a reducing atmosphere. The secondary heat treatment may be performed in a) an oxidizing atmosphere, b) a reducing atmosphere, or c) an oxidizing atmosphere and a reducing atmosphere.

The solid electrolyte layer 30 including a sulfide-based solid electrolyte can be prepared by a solid electrolyte formed of a sulfide-based solid electrolyte material.

The sulfide-based solid electrolyte can be prepared by processing start materials using melt quenching or mechanical milling, but the preparation method thereof is not necessarily limited thereto. Any suitable method may be used as long as it is used to prepare a sulfide-based solid electrolyte in the art. For example, when melt quenching is used, start materials such as $Li_2S$ and $P_2S_5$ can be mixed in predetermined amounts, and formed into pellets. Then, these pellets react in vacuum at a predetermined reaction temperature, and then quenched to prepare a sulfide-based solid electrolyte. The reaction temperature of the mixture of $Li_2S$ and $P_2S_5$ can be, for example, about 400° C. to about 1000° C., or about 800° C. to about 900° C. The reaction time can be, for example, about 0.1 hours to about 12 hours, or about 1 hour to about 12 hours. The quenching temperature of the reaction product can be about 10° C. or less, or about 0° C. or less, and the quenching rate thereof can be about 1° C./sec to about 10000° C./sec, or about 1° C./sec to about 1000° C./sec. For example, when mechanical milling is used, start materials such as $Li_2S$ and $P_2S_5$ can be stirred and reacted to prepare a sulfide-based solid electrolyte. Although the stirring speed and stirring time in the mechanical milling are not particularly limited, the faster the stirring speed, the faster the production rate of the sulfide-based solid electrolyte, and the longer the stirring time, the higher the conversion rate of the raw materials into the sulfide-based solid electrolyte. Then, the mixed raw material obtained by melt quenching, mechanical milling, or the like is heat-treated at a predetermined temperature, and then pulverized to prepare a particle-shaped solid electrolyte. When the solid electrolyte has glass transition characteristics, it is possible for the solid electrolyte to change from amorphous to crystalline by heat treatment.

The solid electrolyte layer 30 can be prepared by depositing the solid electrolyte obtained in this way using a known film forming method such as aerosol deposition, cold spraying, or sputtering. Alternatively, the solid electrolyte layer 30 may be prepared by pressing solid electrolyte particles. Alternatively, the solid electrolyte layer 30 may be prepared by mixing a solid electrolyte, a solvent and a binder and then applying, drying and pressing the mixture.

Manufacture of All-Solid Secondary Battery

The cathode layer 10, and the laminate of the anode layer 20/solid electrolyte layer 30, which have been prepared by the above-described method, can be laminated such that the cathode layer 10 and the anode layer 20 have the solid electrolyte layer 30 therebetween, and then pressed, thereby manufacturing the all-solid secondary battery 1.

For example, the laminate of the anode layer 20/solid electrolyte layer 30 can be disposed on the cathode layer 10 such that the cathode layer 10 and the solid electrolyte layer 30 contact each other to prepare a second laminate, and the second laminate can be pressed to manufacture the all-solid secondary battery 1. The pressing can include roll pressing, flat pressing, or pressing using hydrostatic pressure, but is not limited thereto. Any pressing may be used as long as it is used in the art. The pressure applied during the pressing can be, for example, about 50 MPa to about 750 MPa. The pressing time can be about 5 milliseconds to 5 min. The pressing is performed, for example, at about room temperature to about 90° C., or about 20° C. to about 90° C. Alternatively, the pressing can be performed at a high temperature of 100° C. or higher. The above-described configuration and manufacturing method of the all-solid secondary battery 1 is an example of the embodiment, and structural members, manufacturing procedures, and the like may be appropriately changed. Pressing may be omitted.

Hereinafter, the present disclosure will be described in more detail through the following Examples and Comparative Examples. However, the following Examples are set forth to illustrate the present disclosure, and the scope of the present disclosure is not limited thereto.

EXAMPLES

Example 1: NCA (5.1 mAh/cm$^2$)/LLZO Pellet (500 μm)/GeTe (100 nm)/AgC (7 μm)/Li (20 μm)

LLZO (Li$_7$La$_3$Zr$_2$O$_{12}$) pellets having a thickness of 500 μm were prepared as a solid electrolyte layer.

A Ge—Te alloy film (Ge$_1$T$_{0.5}$ film) having a thickness of about 100 nm was formed on the LLZO pellets through radio frequency (RF) sputtering using a Ge—Te target to form a metal alloy layer, and a first anode active material layer was disposed on the solid electrolyte layer. The mixed atomic ratio (mixed molar ratio) of Ge and Te in the Ge—Te alloy film is 2:1. When sputtering the Ge—Te alloy film, process conditions were a power of 200 watts (W) and a sputtering time of 1800 sec, and N$_2$ (8 mTorr) was used as a plasma gas.

Separately, a slurry for a second anode active material layer was applied onto a stainless steel (SUS) foil by bar coating, and then dried at room temperature (25° C.) for 1 hour to form a second anode active material layer (AgC layer) (thickness: about 7 μm) on the SUS foil.

The slurry for the second anode active material layer was prepared by the following processes.

As an anode active material, carbon black (CB) having a primary particle diameter of about 38 nm and silver (Ag) particles having an average particle diameter of about 100 nm were prepared.

3 g of carbon black (CB) and 1 gram (g) of silver (Ag) particles were put into a container, and 2.692 g of a PVA-PAA binder solution (SUMITOMO SEIKA CHEMICALS CO., LTD, AG binder) was mixed with 7 g of distilled water and then put into the container, followed by primary stirring at a rotation speed of 1000 rpm for 30 minutes to prepare a first slurry. 4 g of zirconia balls and 20 g of distilled water were added to the first slurry, followed by secondary stirring at a rotation speed of 1000 rpm for 30 minutes to prepare a second slurry. 20 g of distilled water were added to the second slurry, followed by third stirring at a rotation speed of 1000 rpm for 30 minutes to prepare a third slurry.

Also, the LLZO film structure provided with the first anode active material layer (metal alloy layer) (Ge$_2$Te$_1$ film) was subjected to acid treatment to prepare a first anode active material layer (metal alloy layer)/LLZO film structure in which pores were formed. During the acid treatment, a 1M aqueous hydrochloric acid solution was used as an acid solution, dipping was performed for 1 second, and then washing was performed with ethanol.

The second anode active material layer (AgC layer) was placed on the first anode active material layer of the first anode active material layer (metal alloy layer)/LLZO film structure, the SUS foil was removed, and a lithium metal foil (thickness: 20 um) and a copper foil as an anode current collector were applied onto the second anode active material layer by cold isotactic pressing (CIP) with a pressure of 250 megaPascals (MPa) at 25° C. to contact each other to prepare a laminate of solid electrolyte layer/first anode active material layer/second anode active material layer/lithium metal/copper thin film.

LiNi$_{0.8}$Co$_{0.15}$Al$_{0.05}$O$_2$ (NCA) was prepared as a cathode active material. Further, polytetrafluoroethylene (Teflon (registered trademark) manufactured by DuPont Corporation) was prepared as a binder. Further, carbon nanofibers (CNF) were prepared as a conductive agent. Then, these materials were mixed at a weight ratio of cathode active material:conductive agent:binder=100:2:1 to obtain a mixture. The mixture was stretched in the form of a sheet to prepare a cathode active material sheet. The cathode active material sheet was pressed to a cathode current collector made of an aluminum foil having a thickness of 18 μm to prepare a cathode layer.

A cathode active material layer of the prepared cathode layer was impregnated with an electrolyte solution in which 2.0 M LiFSI was dissolved in PYR13FSI(N-propyl-N-methyl-pyrrolidinium bis(fluorosulfonyl)imide) as an ionic liquid.

The cathode layer was disposed in a SUS cap such that the cathode active material layer impregnated with the electrolyte solution faces upward. A laminate of solid electrolyte layer/anode layer to which the anode layer was attached was disposed such that the solid electrolyte layer was disposed on the cathode active material layer, and sealed to prepare an all-solid secondary battery. The anode layer and the cathode layer were insulated from each other by an insulator. A part of the cathode current collector and a part of the anode current collector protrude toward the outside of the sealed battery to be used as a cathode terminal and an anode terminal, respectively.

Example 2

An all-solid secondary battery was manufactured in the same manner as in Example 1, except that a Ge—Te film having a thickness of about 100 nm was formed on the LLZO pellets through sputtering and then heat-treated at 200° C. for 2 hours to form a metal alloy layer, and a first anode active material layer was disposed on the solid electrolyte layer.

Example 3

An all-solid secondary battery was manufactured in the same manner as in Example 1, except that the Ge—Te film was formed to have a thickness of 10 nm.

Examples 4 and 5

All-solid secondary batteries were manufactured in the same manner as in Example 1, except that RF sputtering was performed using a Sb—Te target and a Sn—Te target instead of the Ge—Te target, respectively.

Reference Example 1: NCA (5.1 mAh/cm$^2$)/LLZO Pellet (500 μm)/Ag (100 nm)/AgC (7 μm)/Li (20 μm)

An all-solid secondary battery was manufactured in the same manner as in Example 1, except that an Ag film was formed instead of the Ge—Te film.

Comparative Example 1: NCA (5.1 mAh/cm$^2$)/LLZTO Pellet (500 μm)/AgC (7 μm)/Li (20 μm)

An all-solid secondary battery was manufactured in the same manner as in Example 1, except that an LLZO film was used instead of the LLZO film provided with the first anode active material layer (metal alloy layer).

Example 6: NCA (5.1 mAh/cm$^2$)/LLZO Pellet (500 um)/GeTe (100 nm)/Carbon (7 um)/Li (20 um)

Except for using the slurry obtained according to the following procedure as the slurry for forming the second anode active material layer, in the same manner as in Example 1, all-solid secondary battery was formed.

3 g of carbon black (CB) as an anode active material was put into a container, and 2.692 g of a PVA-PAA binder solution (SUMITOMO SEIKA CHEMICALS CO., LTD, AG binder) was mixed with 7 g of distilled water and then put into the container, followed by primary stirring at a rotation speed of 1000 rpm for 30 minutes to prepare a first slurry. 4 g of zirconia balls and 20 g of distilled water were added to the first slurry, followed by secondary stirring at a rotation speed of 1000 rpm for 30 minutes to prepare a second slurry. 20 g of distilled water were added to the second slurry, followed by third stirring at a rotation speed of 1000 rpm for 30 minutes to prepare a third slurry.

Evaluation Example 1: Interfacial Resistance

Figure 6A:
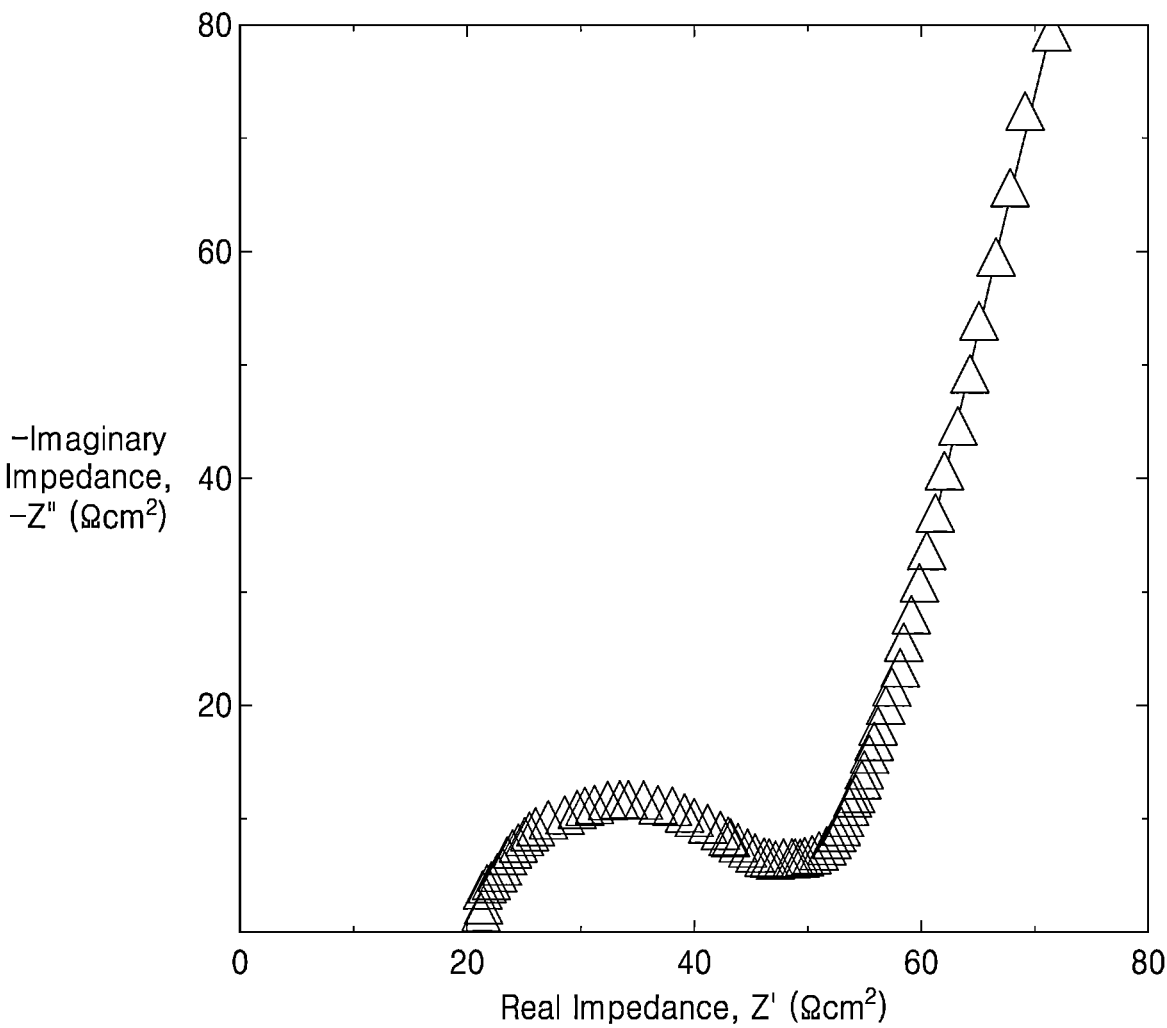
FIGS. 6A and 6B are Nyquist plots of Imaginary impedance Z″ (ohm-square centimeters, $\Omega cm^2$) versus real impedance Z′ (ohm-square centimeters, $\Omega cm^2$) showing impedance measurement results for all-solid secondary batteries manufactured in Example 1 and Reference Example 1, respectively.
Figure 6B:
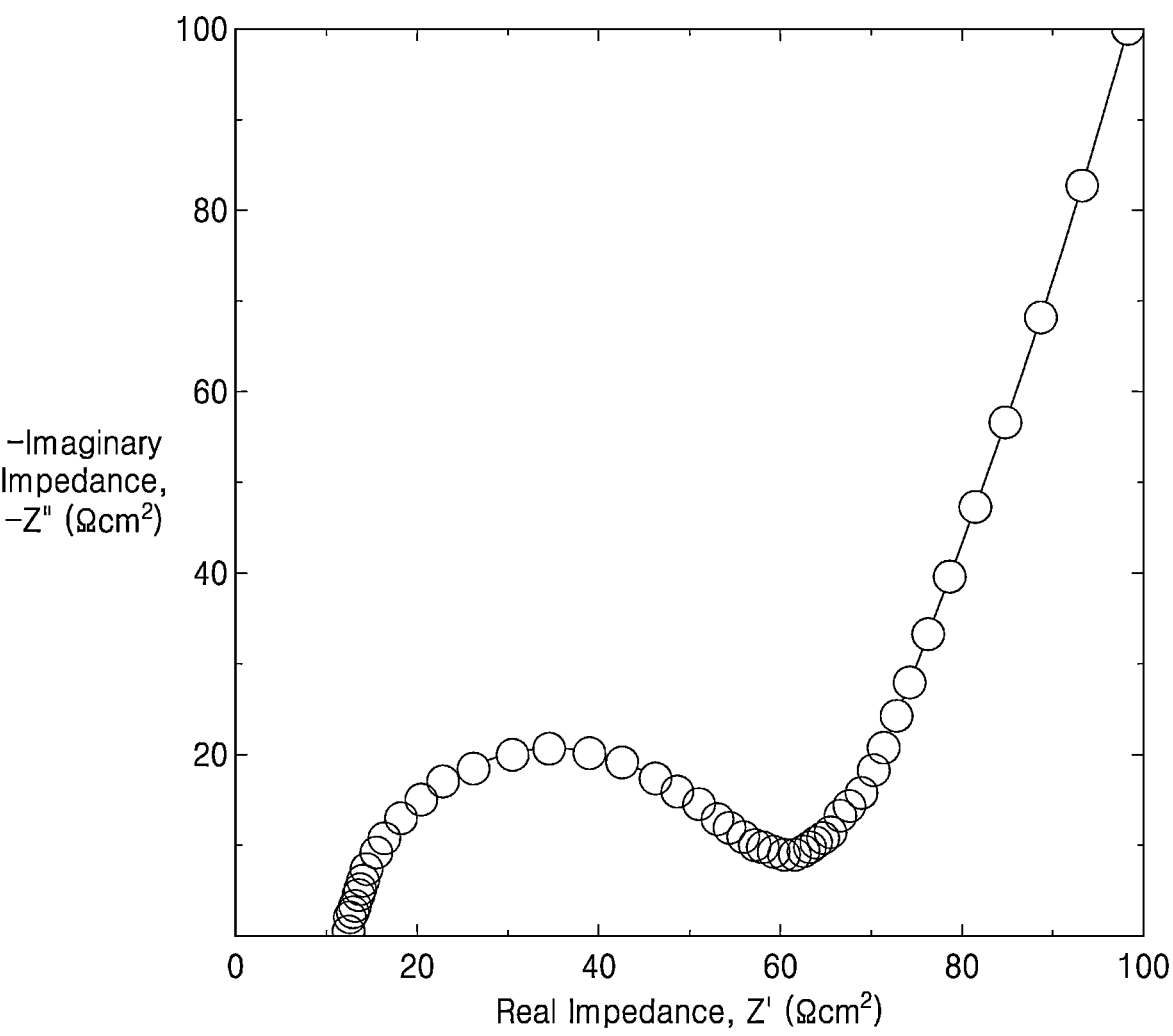

For the all-solid secondary batteries manufactured in Example 1 and Reference Example 1, overall resistances were measured, respectively. For the all-solid secondary batteries manufactured in Example 1 and Reference Example 1, Impedances were measured by a two-probe method using an impedance analyzer (Solartron 1400A/1455A impedance analyzer). The frequency range was about 0.1 Hz to about 1 MHz, and the amplitude voltage was 10 mV. The impedances were measured at 25° C. in an air atmosphere. FIGS. 6A and 6B show Nyquist plots of impedance measurement results, respectively. FIG. 6A shows a Nyquist plot of impedance measurement results for the all-solid secondary battery manufactured in Example 1, and FIG. 6B shows a Nyquist plot of impedance measurement results for the all-solid secondary battery manufactured in Reference Example 1.

As a result of fitting the Nyquist plots of FIGS. 6A and 6B to an equivalent circuit, the all-solid secondary battery of Reference Example 1 had an interfacial resistance of about 80 $\Omega cm^2$ to about 100 $\Omega cm^2$, and the all-solid secondary battery of Example 1 had an interfacial resistance of about 30 $\Omega cm^2$ to about 50 $\Omega cm^2$.

As shown in FIGS. 6A and 6B, the ohmic resistance of the all-solid secondary battery of Example 1 was decreased compared to that of the all-solid secondary battery of Reference Example 1.

Therefore, it was confirmed that the total resistance of the all-solid secondary battery of Example 1 including the interfacial resistance and the ohmic resistance was decreased compared to that of the all-solid secondary battery of Reference Example 1.

Evaluation Example 2: Room-Temperature Charge/Discharge Test

The charge/discharge characteristics of the all-solid secondary batteries manufactured in Example 1, Comparative Example 1 and Reference Example 1 were evaluated by the following charge/discharge test. The charge/discharge test was performed after putting the all-solid secondary battery into a thermostat of 25° C.

In the 1st cycle, the all-solid secondary battery was charged with a constant current of 0.6 $mA/cm^2$ until a battery voltage reached 4.3 V. Subsequently, the all-solid secondary battery was discharged with a constant current of 0.6 $mA/cm^2$ until the battery voltage reached 2.8 V.

In the 2nd to 13th cycles, the all-solid secondary battery was charged with a constant current of 1.5 $mA/cm^2$ until the battery voltage reached 4.3 V. Subsequently, the all-solid secondary battery was discharged with a constant current of 1.5 $mA/cm^2$ until the battery voltage reached 2.8 V.

In the 13th to 350th cycles, the all-solid secondary battery was charged with a constant current of 2.55 $mA/cm^2$ until the battery voltage reached 4.3 V. Subsequently, the all-solid secondary battery was discharged with a constant current of 2.55 $mA/cm^2$ until the battery voltage reached 2.8 V.

Figures 7A, 7B:
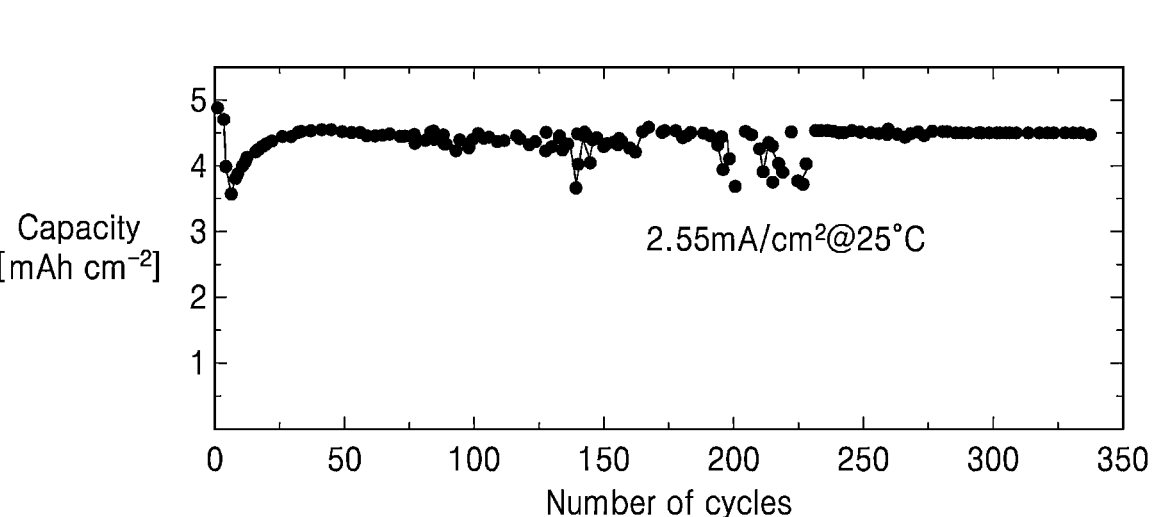
FIG. 7A is a graph of capacity (milliampere-hours per square centimeter, mAh·$^{-2}$) versus number of cycles showing room-temperature charge/discharge characteristics of the all-solid secondary battery of Example 1.
FIG. 7B is a graph of capacity (milliampere-hours per square centimeter, mAh·$^{-2}$) versus number of cycles showing room-temperature charge/discharge characteristics of the all-solid secondary battery of Reference Example 1.
Figure 7C:
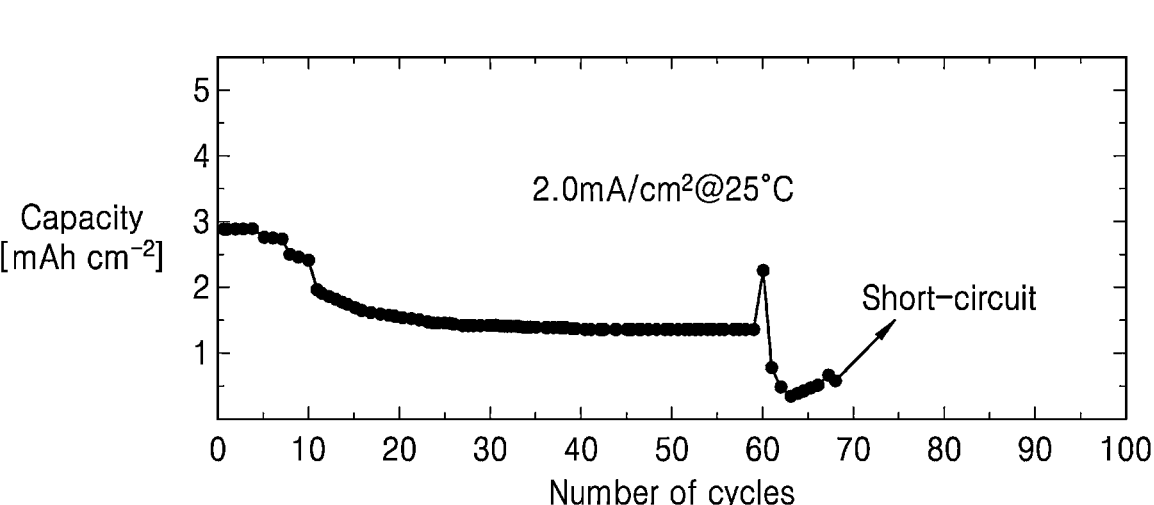
FIG. 7C is a graph of capacity (milliampere-hours per square centimeter, mAh·$^{-2}$) versus number of cycles showing a capacity change of the all-solid secondary battery of Comparative Example 1.

Some of the charging and discharging results are shown in FIGS. 7A, 7B, and 7C.

As shown in FIG. 7A, the all-solid secondary battery of Example 1 was charged and discharged up to 350 cycles without a short circuit, and exhibited stable charging and discharging even at a current density of 2.55 $mA/cm^2$. Even in the 350th cycle, the all-solid secondary battery exhibited a high charge/discharge efficiency of 98% or more. Therefore, it was confirmed that the all-solid secondary battery of Example 1 maintains a stable interface during charging and discharging and induces uniform deposition of lithium. Further, the capacity retention rate of the all-solid secondary battery of Example 1 was improved compared to that of each of the all-solid secondary battery of Reference Example 1 of FIG. 7B and the all-solid secondary battery of Comparative Example 1 of FIG. 7C.

Evaluation Example 3: High-Temperature Charge/Discharge Characteristics

A high-temperature charge/discharge test for the all-solid secondary batteries manufactured in Example 1 and Example 6 was performed according to Evaluation Example 2, except that the charge/discharge test was performed after putting the all-solid secondary battery into a thermostat of 60° C. instead of the thermostat of 25° C. and the all-solid secondary battery was charged and discharged according to the following conditions.

In the 1st cycle, the all-solid secondary battery was charged with a constant current of 0.6 $mA/cm^2$ until a battery voltage reached 4.3 V. Subsequently, the all-solid secondary battery was discharged with a constant current of 0.6 $mA/cm^2$ until the battery voltage reached 2.8 V.

In the 2nd to 13th cycles, the all-solid secondary battery was charged with a constant current of 1.5 $mA/cm^2$ until the battery voltage reached 4.3 V. Subsequently, the all-solid secondary battery was discharged with a constant current of 1.5 $mA/cm^2$ until the battery voltage reached 2.8 V.

In the 14th to 18th cycles, the all-solid secondary battery was charged with a constant current of 2.0 $mA/cm^2$ until the battery voltage reached 4.3 V. Subsequently, the all-solid secondary battery was discharged with a constant current of 2.0 $mA/cm^2$ until the battery voltage reached 2.8 V.

In the 19th to 300th cycles, the all-solid secondary battery was charged with a constant current of 3.1 $mA/cm^2$ (0.61 C) until the battery voltage reached 4.3 V. Subsequently, the all-solid secondary battery was discharged with a constant current of 3.1 $mA/cm^2$ until the battery voltage reached 2.8 V.

Figure 8A:
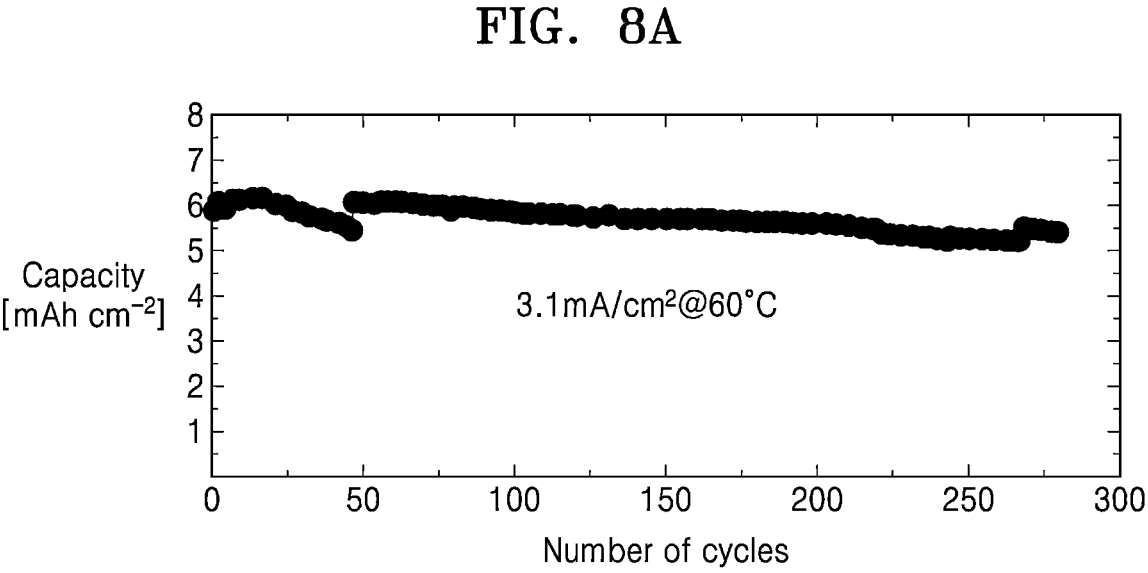
FIG. 8A is a graph of capacity (milliampere-hours per square centimeter, mAh·$^{-2}$) versus number of cycles showing high-temperature charge/discharge characteristics of the all-solid secondary battery of Example 1.
Figures 8B, 8C:
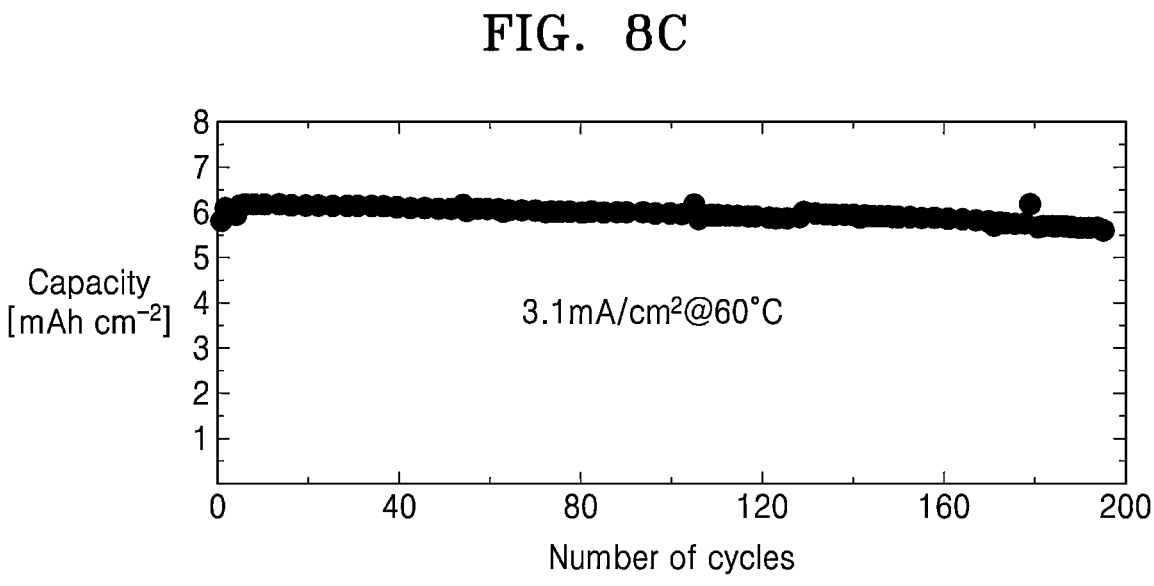
FIG. 8B is a graph of potential (volts vs. Li/Li$^+$, V) versus capacity (milliampere-hours per square centimeter, mAh/cm$^2$) showing a charge/discharge profile of the all-solid secondary battery of Example 1.
FIG. 8C is a graph of capacity (milliampere-hours per square centimeter, mAh·$^{-2}$) versus cycle number showing high-temperature charge/discharge characteristics of the all-solid secondary battery of Example 6.

Some of the charging and discharging results are shown in FIG. 8A and FIG. 8C. FIG. 8A shows the all-solid secondary battery of Example 1, and FIG. 8C shows the all-solid secondary battery of Example 6.

Referring to FIG. 8A and FIG. 8C, it may be found that at a current density of 3.1 $mA/cm^2$ (0.61 C), the capacity retention rate of the all-solid secondary batteries of Example 1 and 6 is very good.

Evaluation Example 4: Charge/Discharge Profile

A high-temperature charge/discharge test for the all-solid secondary battery manufactured in Example 1 was performed according to Evaluation Example 2, except that the charge/discharge test was performed after putting the all-solid secondary battery into a thermostat of 60° C. instead of the thermostat of 25° C.

In the 1st cycle, the all-solid secondary battery was charged with a constant current of 0.62 mA/cm$^2$ until a battery voltage reached 4.3 V. Subsequently, the all-solid secondary battery was discharged with a constant current of 0.62 mA/cm$^2$ until the battery voltage reached 2.8 V.

In the 2nd to 20th cycles, the all-solid secondary battery was charged with a constant current of 2.2 mA/cm$^2$ until the battery voltage reached 4.3 V. Subsequently, the all-solid secondary battery was discharged with a constant current of 2.2 mA/cm$^2$ until the battery voltage reached 2.8 V.

In the 21th to 50th cycles, the all-solid secondary battery was charged with a constant current of 3.1 mA/cm$^2$ until the battery voltage reached 4.3 V. Subsequently, the all-solid secondary battery was discharged with a constant current of 3.1 mA/cm$^2$ until the battery voltage reached 2.8 V.

Some of the charging and discharging results are shown in FIG. 8B.

Referring to FIG. 8B, it may be found that the all-solid secondary battery of Example 1 is stably charged and discharged in the repetitive charge/discharge processes.

Evaluation Example 5: SEM-EDX Analysis

SEM-EDX analysis of the all-solid secondary battery manufactured according to Example 1 was performed, and the results are shown in FIGS. 9A to 9E, respectively.

treatment were performed, respectively. This analysis data is for the case where pressing was not performed.

Figure 10B:
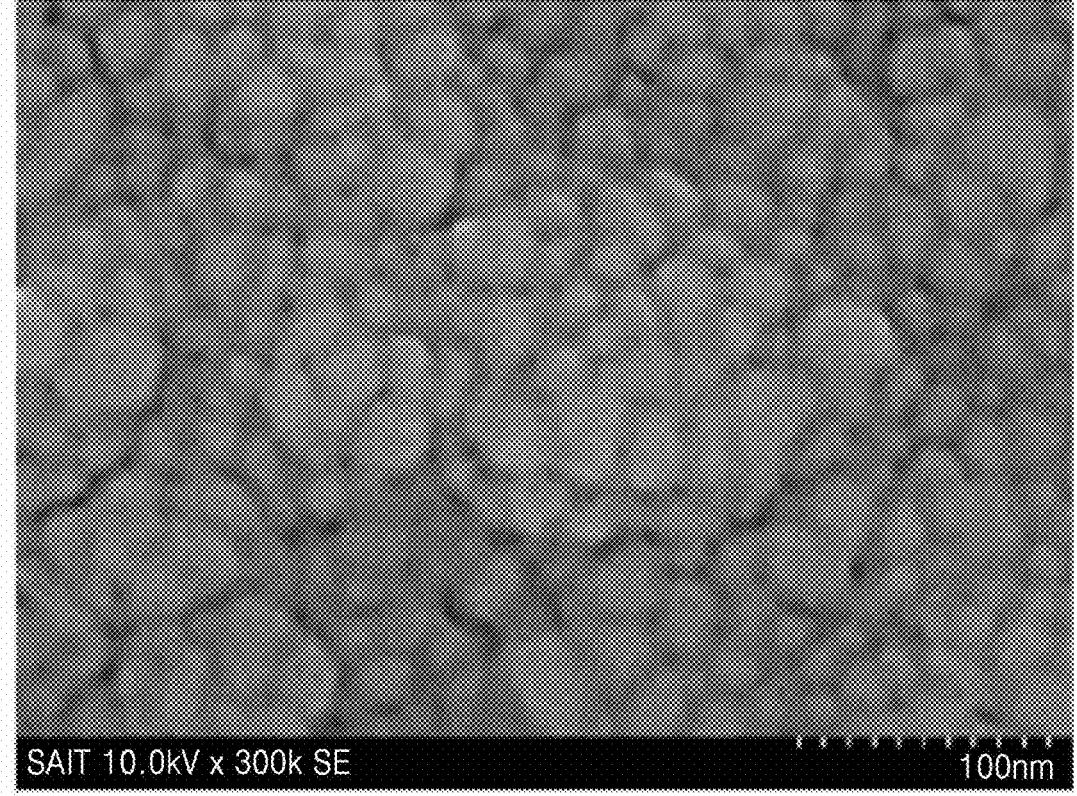
Figure 10D:
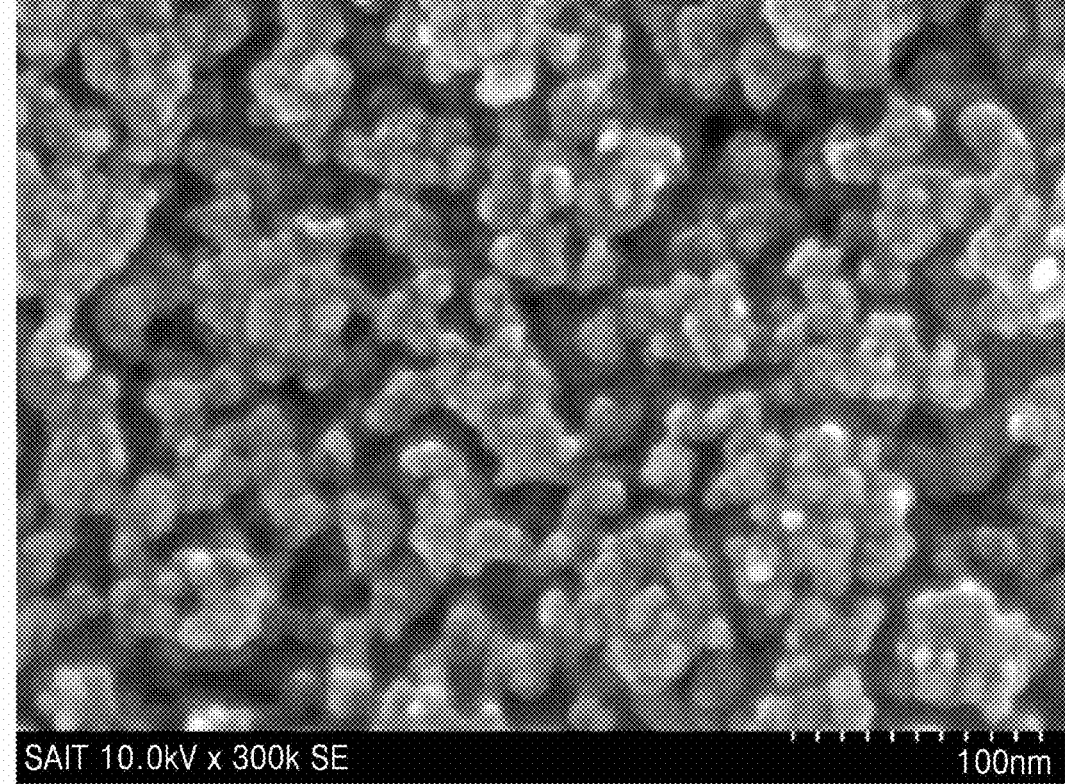

The SEM analysis results are shown in FIGS. 10A to 10D. FIGS. 10A and 10B show the results of SEM analysis of the first anode active material layer (GeTe) before acid treatment in Example 1, and FIGS. 10C and 10D show the results of SEM analysis of the first anode active material layer (GeTe) after the acid treatment in Example 1.

As shown in FIGS. 10C and 10D, it was found that pores were formed in the Ge—Te film after acid treatment. The pores includes open pores and closed pores, and some of the pores were connected to each other. The open pores were mainly present on the surface of the Ge—Te film.

Further, after pressing, the pores in the Ge—Te film may decrease because a carbon-based anode active material partially exists in the pores.

Figure 11:
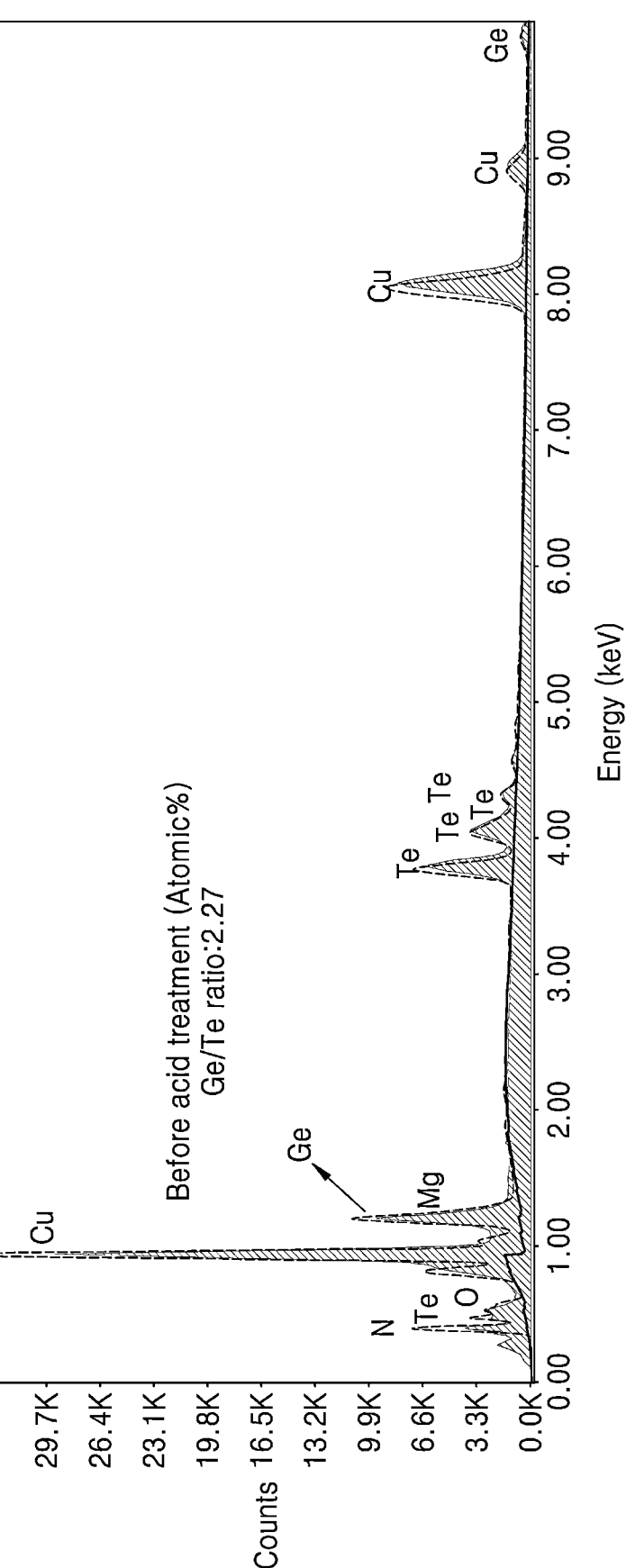
FIGS. 11 and 12 are each a graph of counts (thousands of counts) versus energy (electron volts, eV) and show the results of energy-dispersive X-ray spectroscopy (EDS) of the first anode active material layer (GeTe)/solid electrolyte (LLZO) for each element before and after acid treatment in Example 1, respectively.
Figure 12:
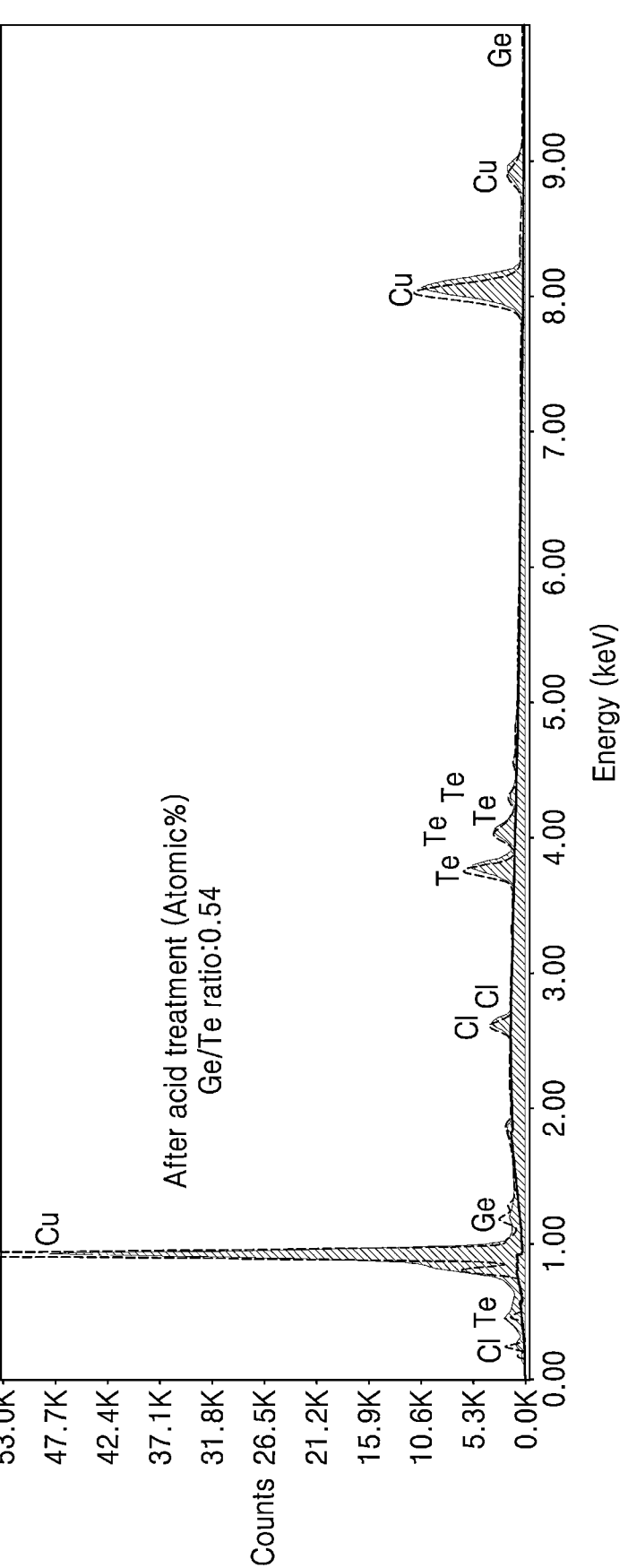

FIGS. 11 and 12 show the results of EDS of the first anode active material layer (GeTe)/solid electrolyte (LLZO) for each element before and after the acid treatment in Example 1, respectively.

Before the acid treatment, the atomic ratio of Ge/Te is 2.27 as shown in FIG. 11 and Table 1. Therefore, the first anode active material layer before the acid treatment is a $Ge_{0.694}Te_{0.306}$ film. After the acid treatment, the atomic ratio of Ge/Te is 0.54 as shown in FIG. 12 and Table 2. Therefore, the first anode active material layer in which pores are formed after acid treatment is a $Ge_{0.351}Te_{0.649}$ film.

TABLE 1

| Element | wt % | at % | Net Int. | Error % | Kratio | Z | A | F |
|---|---|---|---|---|---|---|---|---|
| NK | 12.13 | 38.02 | 2419.05 | 9.02 | 0.0424 | 1.3292 | 0.2627 | 1.0000 |
| OK | 2.58 | 7.08 | 1113.99 | 9.88 | 0.0089 | 1.3022 | 0.2655 | 1.0000 |
| GeL | 16.92 | 10.23 | 4032.22 | 7.95 | 0.0600 | 0.9258 | 0.3835 | 0.9991 |
| MgK | 1.77 | 3.20 | 937.68 | 12.37 | 0.0045 | 1.2046 | 0.2102 | 1.0006 |
| TeL | 13.11 | 4.51 | 4805.38 | 3.13 | 0.1089 | 0.7998 | 1.0339 | 1.0042 |
| CuK | 53.48 | 36.95 | 9612.67 | 3.45 | 0.5283 | 0.9662 | 0.9921 | 1.0305 |

TABLE 2

| Element | wt % | at % | Net Int. | Error % | Kratio | Z | A | F |
|---|---|---|---|---|---|---|---|---|
| GeL | 3.98 | 3.69 | 630.81 | 11.53 | 0.0115 | 0.9751 | 0.2958 | 0.9990 |
| ClK | 1.65 | 3.13 | 1560.13 | 6.78 | 0.0137 | 1.1670 | 0.7019 | 1.0116 |
| TeL | 12.99 | 6.86 | 4043.63 | 3.29 | 0.1119 | 0.8442 | 1.0161 | 1.0045 |
| CuK | 81.39 | 86.32 | 12432.77 | 3.430 | 0.8345 | 1.0274 | 0.9894 | 1.0088 |

Figure 9A:
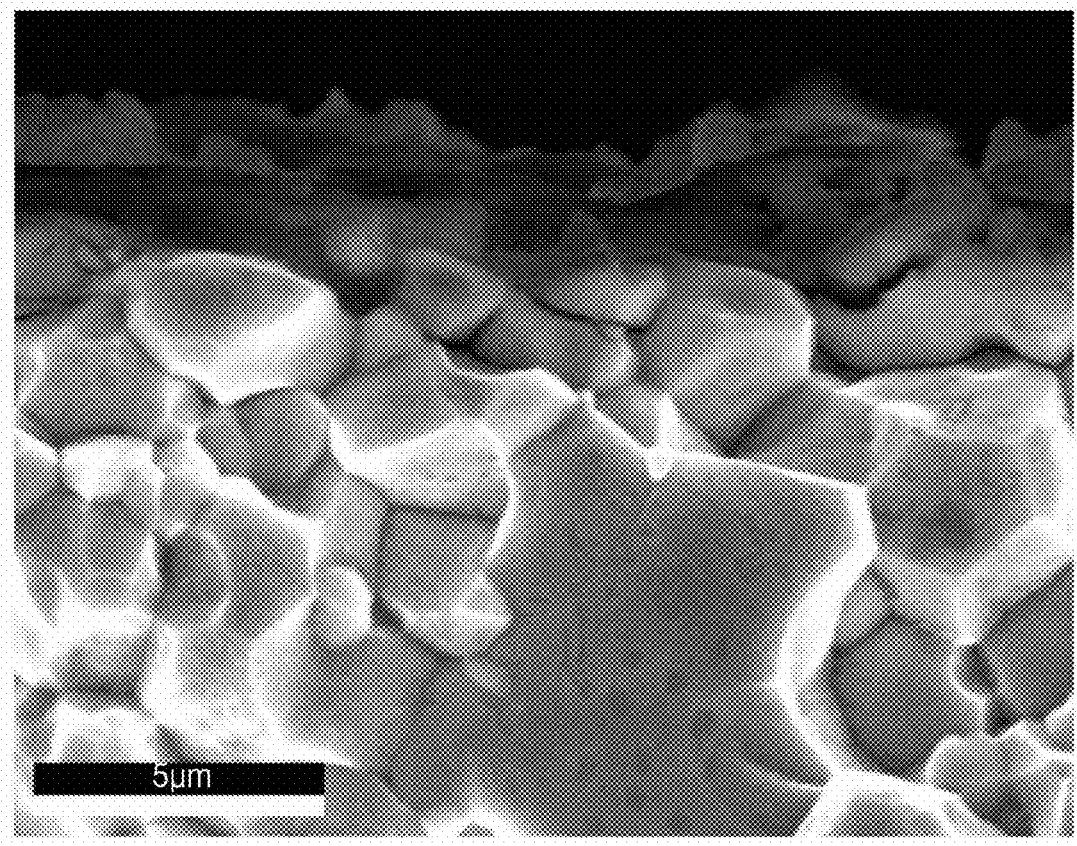
Figure 9B:
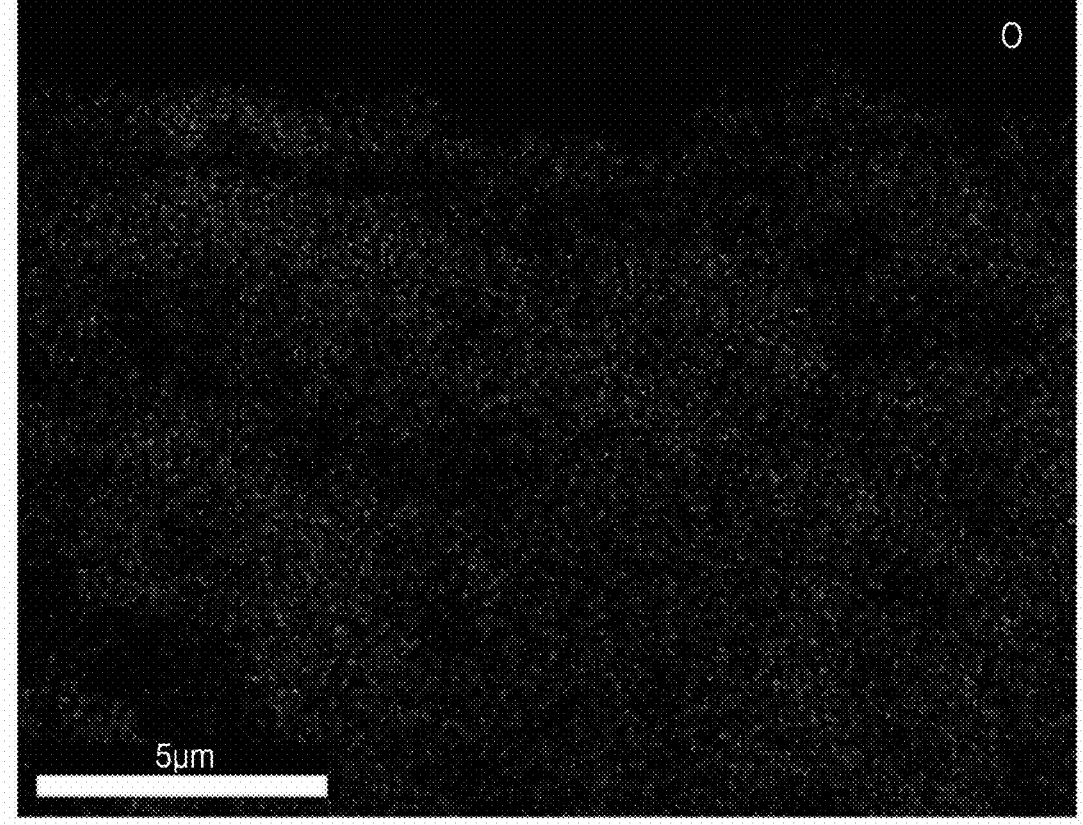
Figure 9D:
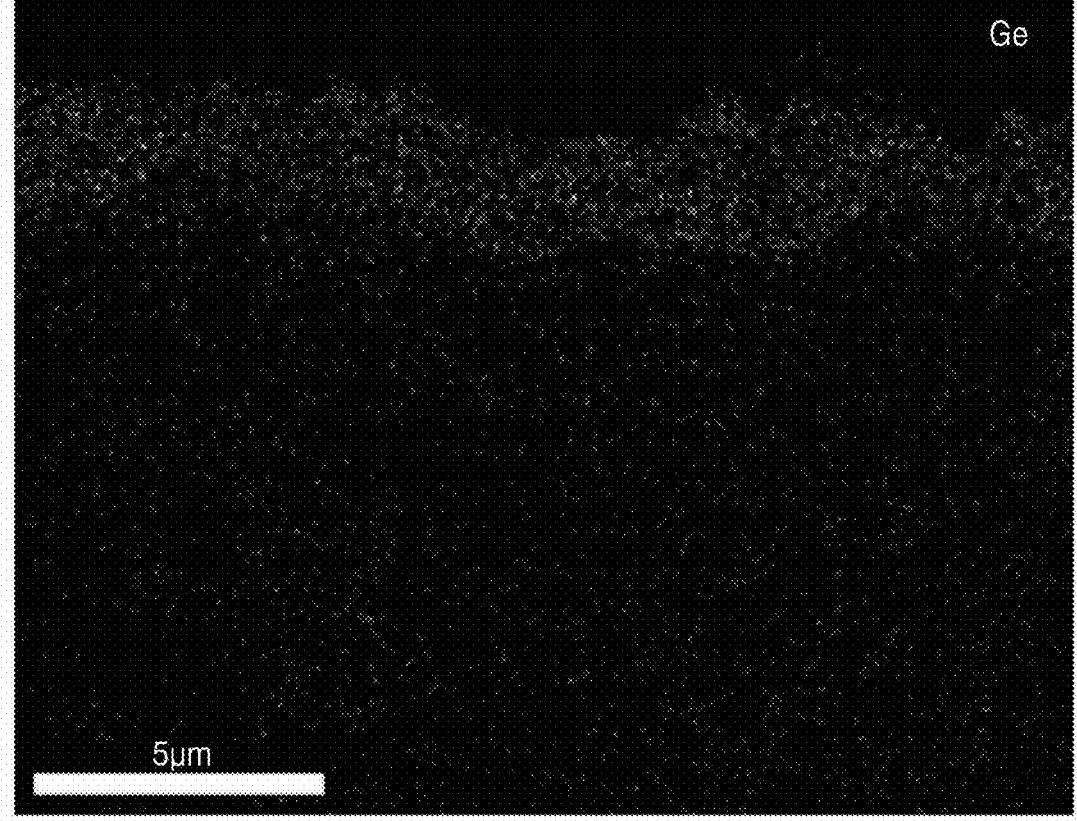
Figure 9E:
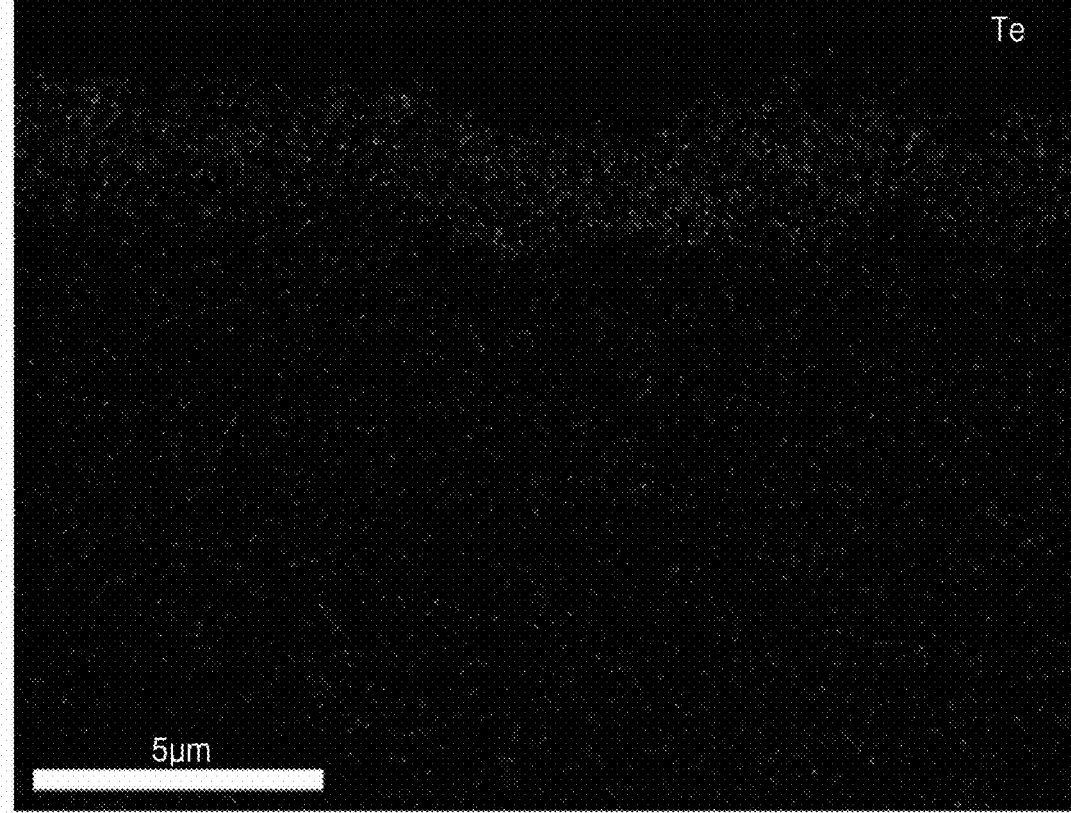

FIG. 9A shows a scanning electron microscope image of the surface of the first anode active material layer (metal alloy layer) of Example 1, and 9B to 9E show oxygen mapping, zirconium mapping, germanium mapping, and tellurium mapping images of EDX for the cross-section of the laminate of the first anode active material layer/solid electrolyte layer manufactured in Example 1, respectively.

Referring to FIGS. 9A to 9E, it was found that a Ge—Te layer, which is the first anode active material layer disposed on the surface of the solid electrolyte layer, exists.

Evaluation Example 6: SEM and EDS Analysis

In the all-solid secondary battery of Example 1, SEM/EDS analyses of a Ge—Te film before and after acid

Evaluation Example 7: Evaluation of Lithium-Ion Diffusion Coefficient

A Ge—Te alloy film ($Ge_2Te_1$ film) having a thickness of about 100 nm was formed on a lithium layer through RF sputtering using a Ge—Te target to form a metal alloy layer, thereby manufacturing a Li/GeTe alloy film structure.

The mixed atomic ratio (mixed molar ratio) of Ge and Te in the Ge—Te alloy film is 2:1. During the deposition of GeTe to 100 nm using sputtering, process conditions were a power of 200 W and a sputtering time of 1800 sec, and $N_2$ (8 mTorr) was used as a plasma gas.

Acid treatment was performed on the Li/GeTe alloy film structure to prepare a structure. During the acid treatment, a 1M aqueous hydrochloric acid solution was used as an acid solution, dipping was performed for 1 second, and then washing was performed with ethanol. Pores were formed in the Ge—Te alloy film (Ge$_2$Te$_1$ film) through acid treatment.

A copper foil was applied onto the Ge—Te alloy film of the structure by cold isotactic pressing (CIP) with a pressure of 250 MPa at 25° C. to contact each other to prepare a laminate. An electrolytic solution was applied to this laminate. As the electrolyte solution, an electrolyte solution, in which 2M LiPF$_6$ is dissolved in a mixed solvent of ethylene carbonate (EC), ethylmethyl carbonate and fluoroethylene carbonate (FEC) at volume ratio of 1:1:1, was used.

The lithium-ion diffusion coefficients of the Ge—Te film of the laminate were measured by Galvanostatic Intermittent Titration Technique (GITT), and the results thereof are shown in Table 3.

TABLE 3

| Class. | Lithium-ion diffusion coefficient (cm$^2$/s) |
|---|---|
| Before acid treatment | $1.5 \times 10^{-13}$ |
| After acid treatment | $7.3 \times 10^{-13}$ |

Referring to Table 3, it may be confirmed that the structure has the pores formed after acid treatment, thereby greatly increasing a lithium-ion diffusion coefficient.

Evaluation Example 8: AFM Analysis

After sputtering GeTe on LLZO according to Example 1, surface roughness was measured through AFM analysis before and after acid treatment, and the results thereof are shown in Table 4.

TABLE 4

| Class. | Surface roughness Root mean square, RMS)(nm) |
|---|---|
| Before acid treatment | 217.9 |
| After acid treatment | 319.97 |

Referring to Table 4, it was confirmed that after acid treatment, surface roughness were increased compared to those of the AFM analysis results before acid treatment.

Embodiments have been described in detail above with reference to the accompanying drawings, but the present disclosure is not limited to these embodiments. It is obvious that those with ordinary knowledge in the technical field to which the present disclosure belongs can derive various changes or modifications within the scope of the technical idea described in the claims, and these change and modifications will be belong to the technical scope of the present disclosure.

According to an aspect, it is possible to manufacture an all-solid secondary battery in which the diffusion of metal in an electrode is suppressed during high-temperature charging and discharging to prevent a short circuit, and cycle characteristics are improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
a cathode layer comprising a cathode active material;
an anode layer comprising an anode current collector, a first anode active material layer, and a second anode active material layer between the anode current collector and the first anode active material layer; and
a solid electrolyte layer between the cathode layer and the anode layer and comprising a solid electrolyte,
wherein the first anode active material layer is adjacent to the solid electrolyte layer, and the first anode active material layer comprises a first anode active material comprising a metal or metal alloy capable of forming an alloy or a compound with lithium,
and the second anode active material layer comprises a second anode active material comprising a carbon anode active material, and optionally, a metal or metalloid anode active material,
wherein the first anode active material includes pores having a size of about 3 nanometers to about 50 nanometers.

2. The all-solid secondary battery of claim 1,
wherein a portion of the second anode active material is disposed in the pores of the first anode active material.

3. The all-solid secondary battery of claim 1,
wherein the first anode active material has a porosity of about 20% to about 80%, based on total volume of the first anode active material.

4. The all-solid secondary battery of claim 1,
wherein the first anode active material layer comprises the metal alloy, and the metal alloy is represented by M1M2, wherein M1 is a first metal, which is soluble in an acid, and M2 is a second metal, which is insoluble in the acid.

5. The all-solid secondary battery of claim 4,
wherein M1 and M2 each have a eutectic temperature of about 300° C. to about 1500° C. when forming an alloy with Li.

6. The all-solid secondary battery of claim 4,
wherein M1 is at least one element of Li, Na, K, Rb, Cs, Mg, Ca, Sr, Ba, Sc, V, Cr, Mn, Fe, Co, Ni, Cu, Zn, Ga, Al, Ge, Y, Zr, Hf, Nb, Tc, Rh, Cd, In, B, Si, P, F, Cl, Br, I, S, As, Sb, Bi, Ta, Re, Hg, Tl, or Pb, optionally in combination with at least one selected from C, or N, and
M2 comprises at least one of Ti, Mo, Ru, Pd, Ag, Sn, Se, Te, W, Os, Ir, Pt, or Au.

7. The all-solid secondary battery of claim 1,
wherein the first anode active material layer has a lithium-ion diffusion coefficient of about $1\times10^{-14}$ square centimeters per second to about $5\times10^{-9}$ square centimeters per second at 25° C., and the lithium-ion diffusion coefficient of the second anode active material layer at 25° C. is at least 10 times less than the lithium-ion diffusion coefficient of the first anode active material layer.

8. The all-solid secondary battery of claim 4,
wherein M1 is germanium, and M2 is at least one of tellurium, or selenium.

9. The all-solid secondary battery of claim 4,
wherein a molar ratio of M1 and M2 is about 1:1 to about 1:500.

10. The all-solid secondary battery of claim 1,
wherein the first anode active material layer comprises at least one alloy of Ge$_x$Te$_y$ wherein 0<x≤3, 0<y≤2, Sb$_x$Te$_y$ wherein 0<x<1, 0<y<1, Ge$_x$Se$_y$ wherein 0<x≤1, and 0<y≤1, Te$_x$Ga$_y$ wherein 0<x≤3, and 0<y≤2, Te$_x$Zn$_y$ wherein $0<x\leq1$, and $0<y\leq2$, $Te_xBi_y$ wherein $0<x\leq3$, and $0<y\leq2$, $Te_xSb_y$, wherein $0<x\leq3$, and $0<y\leq2$, $Te_xBi_y$ wherein $0<x\leq6$, and $0<y\leq14$, $Te_xAu_y$ wherein $0<x\leq2$, and $0<y\leq1$, $Te_xAs_y$ wherein $0<x<3$, and $0<y\leq4$, $Te_xAs_y$, wherein $0<x\leq3$, and $0<y\leq2$, $Te_xSn_y$ wherein $0<x\leq1$, and $0<y\leq1$, $Te_xSr_y$ wherein $0<x\leq1$, and $0<y\leq1$, $Te_xY_y$ wherein $0<x\leq3$, and $0<y\leq2$, $Te_xZr_y$ wherein $0<x\leq5$, and $0<y\leq1$, $Te_xNb_y$ wherein $0<x\leq2$, and $0<y\leq1$, $Te_xMo_y$ wherein $0<x\leq2$, and $0<y\leq1$, $Te_xAg_y$ wherein $0<x\leq1$, and $0<y\leq2$, $Te_xIn_y$ wherein $0<x\leq3$, and $0<y\leq2$, $Te_xPd_y$ wherein $0<x\leq2$, and $0<y\leq1$, $Bix$-$Sby$-$Tez$ wherein $0<x\leq4$, $0<y\leq4$, and $0<z\leq4$, $Bi_x$—$Se_y$-$Tey_z$ wherein $0<x\leq4$, $0<y\leq4$, and $0<z\leq4$, $Se_x$—$Sb_y$—$Te_z$ wherein $0<x\leq4$, $0<y\leq4$, and $0<z\leq4$, $Ge_x$—$Sb_y$—$Te_z$ wherein $0<x\leq4$, $0<y\leq4$, and $0<z<4$, or $Ge_x$—$Sb_y$—$Se_z$—$Te_k$ wherein $0<x\leq4$, $0<y\leq4$, $0<z\leq4$, and $0<k\leq4$.

11. The all-solid secondary battery of claim 1, wherein the first anode active material layer comprises at least one of $Ge_1Te_1$, $Ge_{0.5}Te_1$, $Ge_{0.54}Te_1$, $Ge_{0.6}Te_1$, $Ge_{0.65}Te_1$, $Ge_{0.7}Te_1$, $Ge_{0.75}Te_1$, $Ge_{0.8}Te_1$, $Ge_{0.85}Te_1$, $Ge_{0.9}Te_1$, $Ge_{0.95}$ $Te_1$, $Ge_{0.35}Te_{0.65}$, $Ga_2Te_3$, $TeZn_2$, $Bi_2Te_3$, $GeSe$, $Sb_2Te_3$, $Bi_{14}Te_6$, $Te$—$Pb$, $AuTe_2$, $As_4Te_3$, $As_2Te_3$, $SnTe$, $SrTe$, $Y2Te_3$, $ZrTe_5$, $NbTe_2$, $MoTe_2$, $Ag_2Te$, $CdTe$, $In_2Te_3$, $SnTe$, $PdTe_2$, $Bi$—$Sb$—$Te$, $Bi$—$Se$—$Te$, $Se$—$Sb$—$Te$, $Ge$—$Sb$—$Te$, or $Ge$—$Sb$—$Se$—$Te$.

12. The all-solid secondary battery of claim 1, wherein a thickness of the first anode active material layer is about 3% to about 50% of a thickness of the cathode active material layer, and the thickness of the first anode active material layer is about 10 nanometers to about 500 nanometers.

13. The all-solid secondary battery of claim 1, further comprising an interlayer between the first anode active material layer and the solid electrolyte layer.

14. The all-solid secondary battery of claim 13, wherein the interlayer comprises at least one of lithium tellurium oxide, lithium selenium oxide, lithium tellurium alloy oxide, or lithium selenium alloy oxide.

15. The all-solid secondary battery of claim 13, wherein the interlayer comprises at least one of a compound of Formula 1, or a compound of Formula 2:

$$Li(Te_aSe_{1-a})_xM_yO_z \qquad \text{Formula 1}$$

wherein in Formula 1, M is at least one of Ge, Si, Sn, Al, Zn, Mg, Pb, As, Na, Bi, Ti, B, W, Mn, Fe, Ni, Cu, Cr, Zr, Ce, Sb, Ga, Au, Sr, Y, Nb, Mo, Ag, or In, and $0<a\leq1$, $0<x\leq6$, $0\leq y\leq14$, and $0<z\leq1$ are satisfied, $$Li(Se_aTe_{1-a})_xM_yO_z \qquad \text{Formula 2}$$

wherein, in Formula 2, M is at least one of Ge, Si, Sn, Al, Zn, Mg, Pb, As, Na, Bi, Ti, B, W, Mn, Fe, Ni, Cu, Cr, Zr, Ce, Sb, Ga, Au, Sr, Y, Nb, Mo, Ag, or In, and $0<a\leq1$, $0<x\leq6$, $0\leq y\leq14$, and $0<z\leq1$ are satisfied.

16. The all-solid secondary battery of claim 13, wherein the interlayer has a thickness of about 1 nanometer to about 10 nanometers.

17. The all-solid secondary battery of claim 1, wherein a surface of the first anode active material layer comprises at least one of C, Cl, O, P, OH, S, or $SO_3$.

18. The all-solid secondary battery of claim 1, wherein a lithium-ion reduction potential of the first anode active material layer is greater than a reduction potential of the solid electrolyte.

19. The all-solid secondary battery of claim 1, wherein the carbon anode active material is in a form of particles, and the carbon anode active material particles have an average particle diameter of about 4 micrometers or less.

20. The all-solid secondary battery of claim 1, wherein the carbon anode active material comprises amorphous carbon, and the metal or metalloid anode active material comprises at least one of indium, silicon, gallium, tin, aluminum, titanium, zirconium, niobium, germanium, antimony, bismuth, gold, platinum, palladium, magnesium, silver, or zinc.

21. The all-solid secondary battery of claim 1, wherein the second anode active material layer comprises a composite of first particles comprising an amorphous carbon and second particles comprising a metal or metalloid, a content of the second particles is about 1 weight percent to about 60 weight percent, based on a total weight of the composite, or a mixture of first particles comprising amorphous carbon and second particles comprising a metal or metalloid, and a content of the second particles is about 1 weight percent to about 60 weight percent, based on a total weight of the mixture.

22. The all-solid secondary battery of claim 1, further comprising a third anode active material layer between the anode current collector and the second anode active material layer, or between the second anode active material layer and the first anode active material layer, wherein the third anode active material layer comprises a metal layer comprising lithium or a lithium alloy.

23. The all-solid secondary battery of claim 1, wherein the anode current collector, the first anode active material layer, the second anode active material layer, and areas therebetween are Li-free areas not comprising lithium in an initial state or post-discharge state of the all-solid secondary battery.

24. The all-solid secondary battery of claim 1, wherein the solid electrolyte is an oxide solid electrolyte, a sulfide solid electrolyte, or a combination thereof.

25. The all-solid secondary battery of claim 24, wherein the oxide solid electrolyte is at least one of $Li_{1+x+y}Al_xTi_{2-x}Si_yP_{3-y}O_{12}$ wherein $0<x<2$, and $0\leq y<3$, $BaTiO_3$, $Pb(Zr_xTi_{1-x})O_3$ wherein $0<x<1$, $Pb_{1-x}La_xZr_{1-y}Ti_yO_3$ wherein $0\leq x<1$, and $0\leq y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ wherein $0<x<2$, and $0<y<3$, $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$ wherein $0\leq x\leq1$, $0\leq y\leq1$, $0<a<1$, and $0<b<1$, $Li_xLa_yTiO_3$ wherein $0<x<2$, $0<y<3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ wherein M is at least one of Te, Nb, or Zr, and x is an integer of 1 to 10.

26. The all-solid secondary battery of claim 24, wherein the sulfide solid electrolyte is at least one of $Li_2S$—$P_2S_5$, $Li_2S$—$P_2S_5$—$LiX$ wherein X is a halogen, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ wherein m and n are positive numbers, Z is at least one of Ge, Zn, or Ga, $Li_2S$—$GeS_2$, $Li_2S$—$SiS_2$—$Li_3PO_4$, $Li_2S$—$SiS_2$—$Li_pMO_q$ wherein p and q are positive numbers, Mis P, Si, Ge, B, Al, Ga, or In, $Li_{7-x}PS_{6-x}Cl_x$ wherein $0\leq x\leq2$, $Li_{7-x}PS_{6-x}Br_x$ wherein $0\leq x\leq2$, or $Li_{7-x}PS_{6-x}I_x$ wherein $0\leq x\leq2$.

27. An anode layer comprising:

an anode current collector, a first anode active material layer, and a second anode active material layer between the anode current collector and the first anode active material layer;

wherein the first anode active material layer is adjacent to a solid electrolyte layer and comprises a porous first active material comprising a metal or metal alloy capable of forming an alloy or a compound with lithium, and the second anode active material layer comprises a second anode active material comprising a carbon anode active material, and optionally, a metal or metalloid anode active material, wherein the pores of the first anode active material are about 3 nanometers to about 50 nanometers.

28. An all-solid secondary battery comprising:

a cathode layer comprising a cathode active material;

an anode layer comprising an anode current collector, a first anode active material layer, and a second anode active material layer between the anode current collector and the first anode active material layer; and a solid electrolyte layer between the cathode layer and the anode layer and comprising a solid electrolyte, wherein the first anode active material layer includes pores and is adjacent to the solid electrolyte layer, and the first anode active material layer consists of a metal or metal alloy capable of forming an alloy or a compound with lithium, and the second anode active material layer comprises a second anode active material comprising a carbon anode active material, and optionally, a metal or metalloid anode active material.

29. A method of manufacturing an all-solid secondary battery, the method comprising:

providing a solid electrolyte layer having a first surface and an opposite second surface;

placing a first anode active material layer on the first surface of the solid electrolyte layer;

forming pores in the first anode active material layer to provide a porous first anode active material;

providing an anode current collector and a second anode active material layer on the anode current collector;

positioning the porous first anode active material adjacent to the second anode active material layer; and positioning a cathode active material layer on the second surface of the solid electrolyte layer to manufacture an all-solid secondary battery, wherein a size of the pores of the first anode active material are about 3 nanometers to about 50 nanometers.

30. The method of claim 29, wherein the forming pores in the first anode active material layer comprises treating the first anode active material layer with an acid or a pore former.

31. The method of claim 30, wherein the first anode active material layer comprises a Ge—Te alloy, and a molar ratio of Ge and Te in the Ge—Te alloy before treating the first anode active material layer with the acid is about 2.5:1 to about 1:500, and a molar ratio of Ge and Te in the Ge—Te alloy after treating the first anode active material layer with the acid is about 1:1.5 to about 1:100.

32. The method of claim 29, wherein the placing the first anode active material layer on the first surface of the solid electrolyte layer comprises forming the first anode active material layer by at least one of sputtering, spin coating, drop coating, spray coating, or solution infiltration.

33. The method of claim 29, further comprising heat treating at about 150° C. to about 400° C. after the placing of the first anode active material layer on the first surface of the solid electrolyte layer.

* * * * *